(12) United States Patent
Enamito

(10) Patent No.: US 11,067,546 B2
(45) Date of Patent: Jul. 20, 2021

(54) ESTIMATING APPARATUS AND ESTIMATING METHOD

(71) Applicant: KABUSHIKI KAISHA TOSHIBA, Minato-ku (JP)

(72) Inventor: Akihiko Enamito, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 140 days.

(21) Appl. No.: 16/555,630

(22) Filed: Aug. 29, 2019

(65) Prior Publication Data
US 2020/0300819 A1    Sep. 24, 2020

(30) Foreign Application Priority Data

Mar. 18, 2019 (JP) .............................. JP2019-049882

(51) Int. Cl.
*G01N 29/44* (2006.01)
*G01N 29/12* (2006.01)

(52) U.S. Cl.
CPC ......... *G01N 29/4463* (2013.01); *G01N 29/12* (2013.01); *G01N 2291/014* (2013.01); *G01N 2291/02872* (2013.01); *G01N 2291/2636* (2013.01)

(58) Field of Classification Search
None
See application file for complete search history.

(56) References Cited

U.S. PATENT DOCUMENTS

| 5,377,275 A | 12/1994 | Suzuki |
| 5,748,750 A | 5/1998 | L'Esperance et al. |
| 9,936,293 B2 | 4/2018 | Enamito et al. |

(Continued)

FOREIGN PATENT DOCUMENTS

| EP | 0 837 452 A2 | 4/1998 |
| JP | 3920226 B2 | 5/2007 |

(Continued)

OTHER PUBLICATIONS

J. J. da Silva, A. M. N. Lima, F. H. Neff and J. S. da Rocha Neto, "Non-lnvasive Fast Detection of Internal Fouling Layers in Tubes and Ducts by Acoustic Vibration Analysis," in IEEE Transactions on Instrumentation and Measurement, vol. 58, No. 1, pp. 108-114, Jan. 2009. (Year: 2009).*

*Primary Examiner* — Roy Y Yi
(74) *Attorney, Agent, or Firm* — Oblon, McClelland, Maier & Neustadt, L.L.P.

(57) ABSTRACT

According to one embodiment, an estimating apparatus includes an insertion tube, a first sensor, a second sensor, a processing unit, an adder, and an analyzer. The insertion tube is detachably mounted midway along a coupling tube that couples an excitation source to a main unit. The first sensor is provided inside the insertion tube at a first distance from an exit of a space housing the excitation source. The second sensor is provided at a second distance from the first sensor. The processing unit performs filter processing to a first signal obtained by the first sensor. The adder adds a filtered signal and a second signal obtained by the second sensor, the first signal being the first signal having undergone filter processing by the processing unit. The analyzer analyzes a frequency of a signal obtained by the adder.

14 Claims, 15 Drawing Sheets

(56) References Cited

U.S. PATENT DOCUMENTS

| | | |
|---|---|---|
| 2006/0137454 A1 | 6/2006 | Higashihara |
| 2007/0180913 A1 | 8/2007 | Higashihara |
| 2010/0166197 A1 | 7/2010 | Fukuda et al. |
| 2014/0139720 A1 | 5/2014 | Ogata et al. |
| 2014/0286501 A1 | 9/2014 | Enamito et al. |
| 2016/0061640 A1* | 3/2016 | Joshi ................ G01F 15/18 73/197 |

FOREIGN PATENT DOCUMENTS

| | | |
|---|---|---|
| JP | 4209806 B2 | 1/2009 |
| JP | 2009-284097 A | 12/2009 |
| JP | 5242313 B2 | 7/2013 |
| JP | 6114587 B2 | 4/2017 |

* cited by examiner

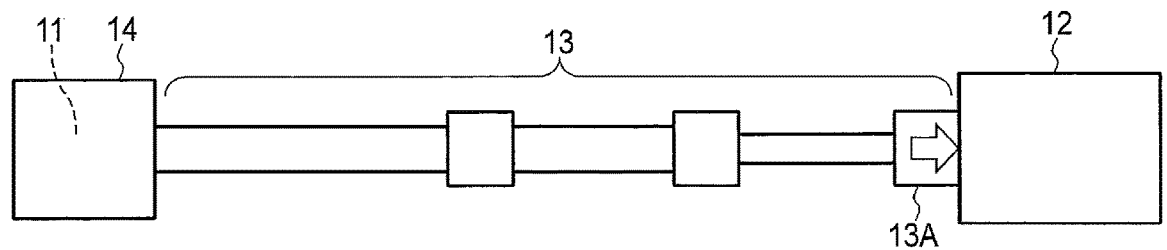
F I G. 1
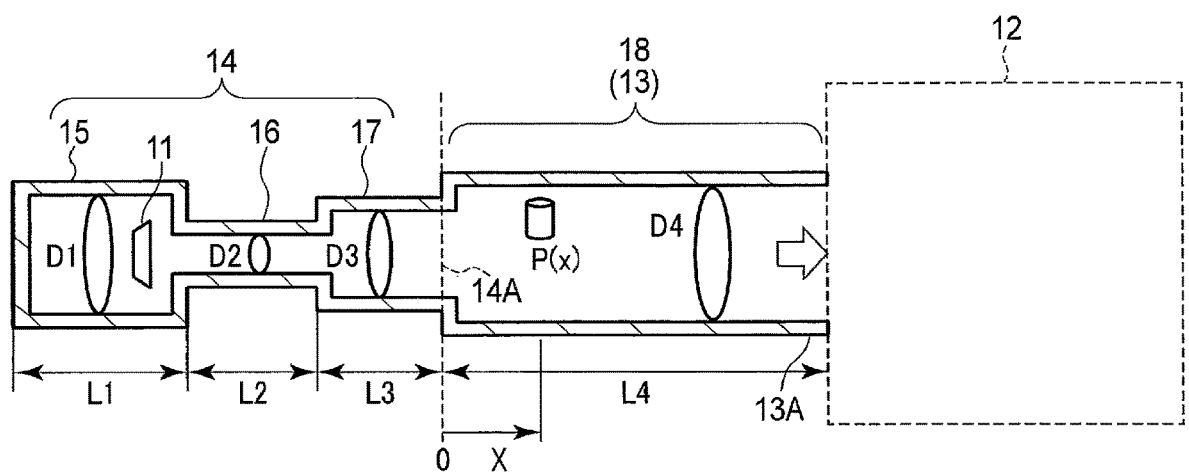
F I G. 2 x=3mm x=6mm

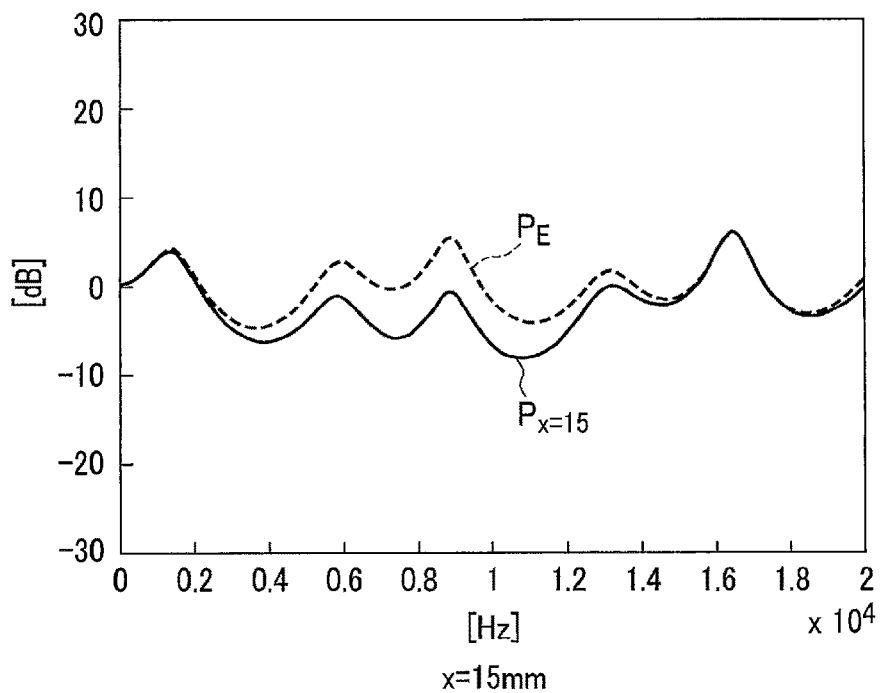
F I G. 5
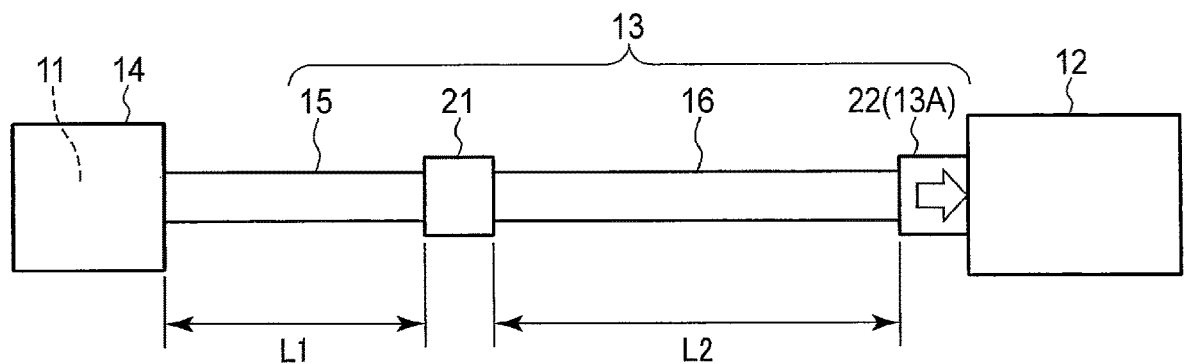
F I G. 6

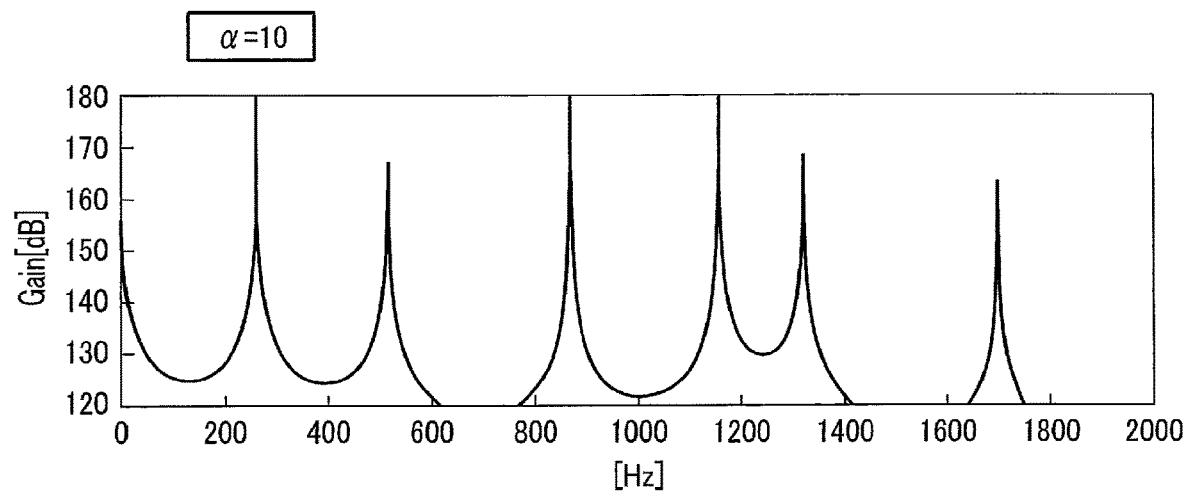
F I G. 7
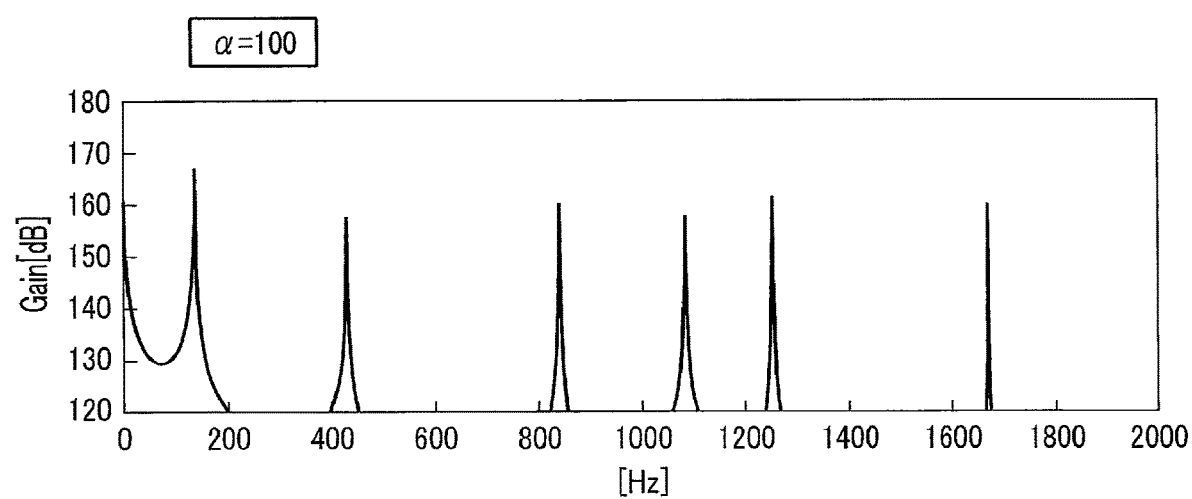
F I G. 8

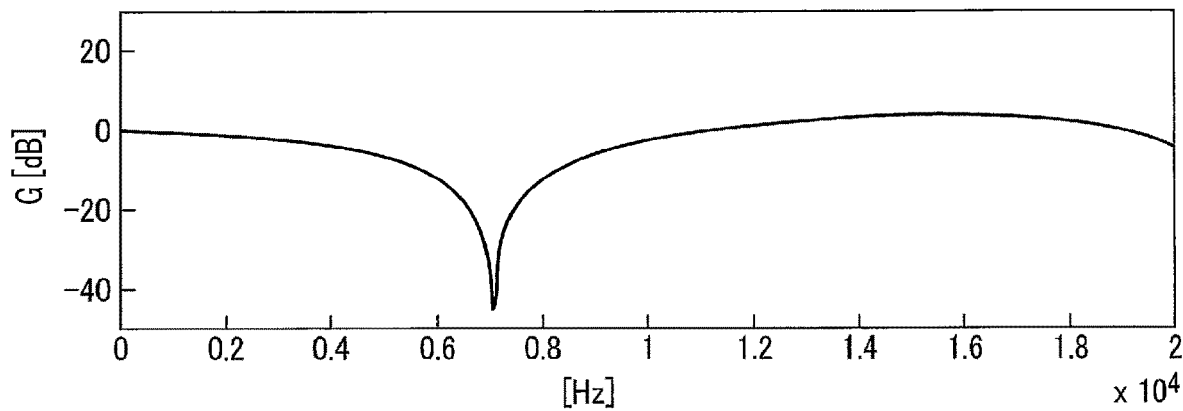
F I G. 13
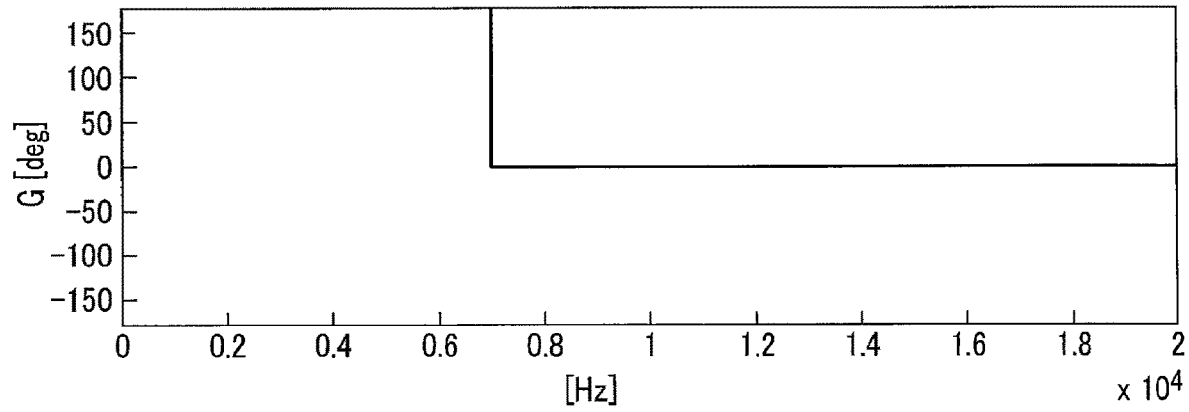
F I G. 14
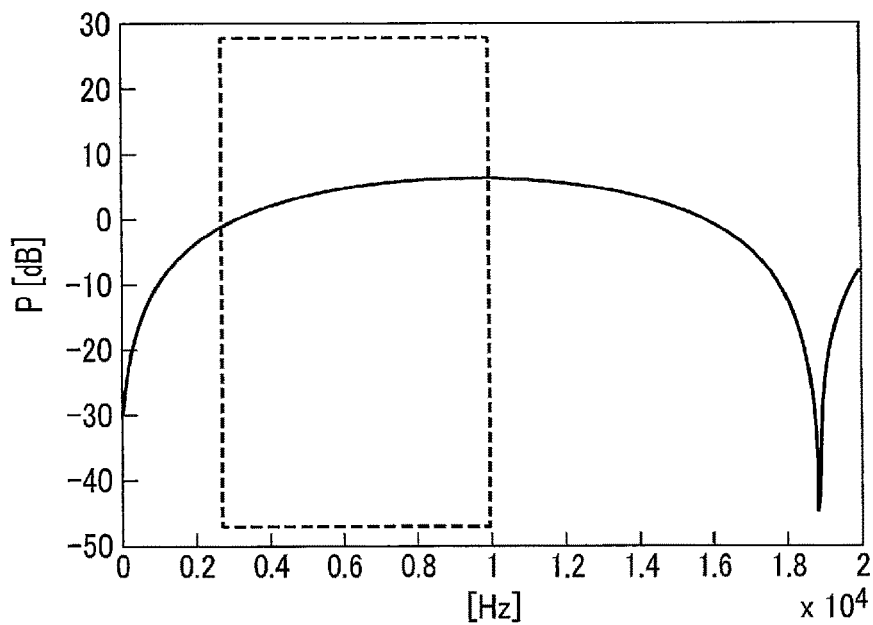
F I G. 15

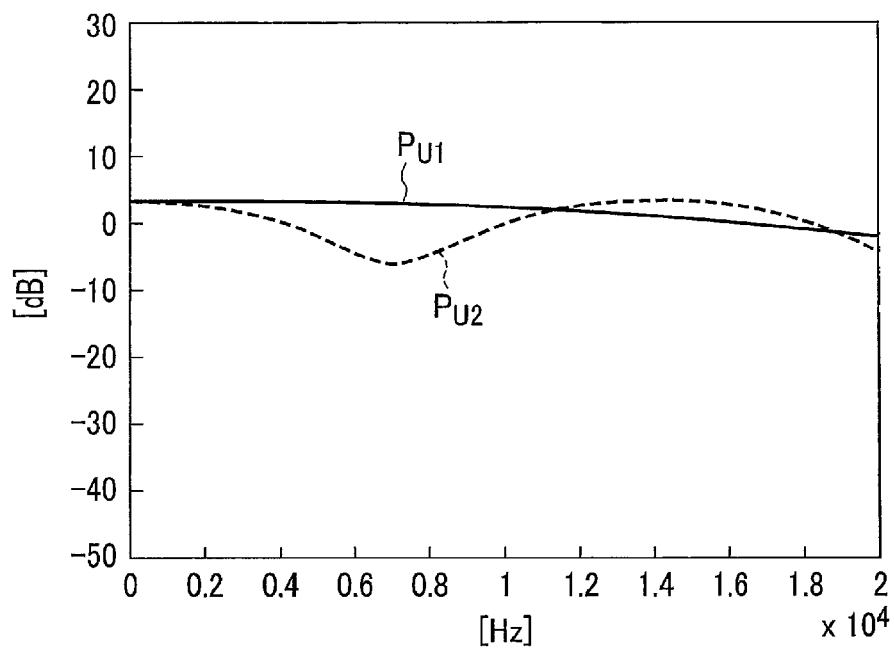
F I G. 16
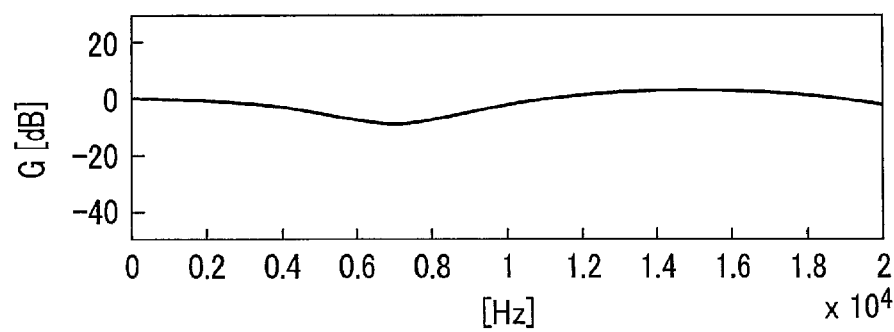
F I G. 17
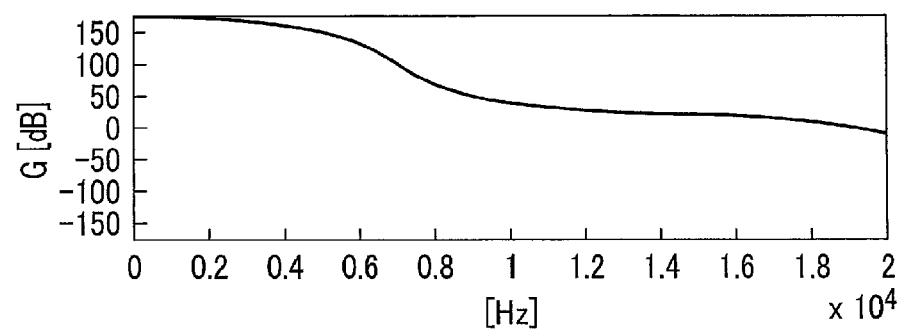
F I G. 18

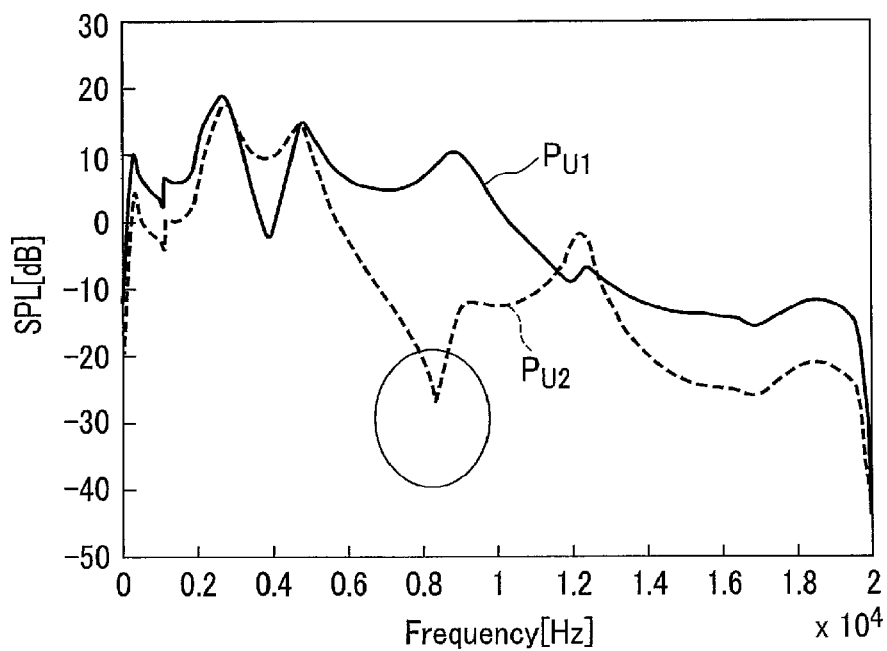
F I G. 21
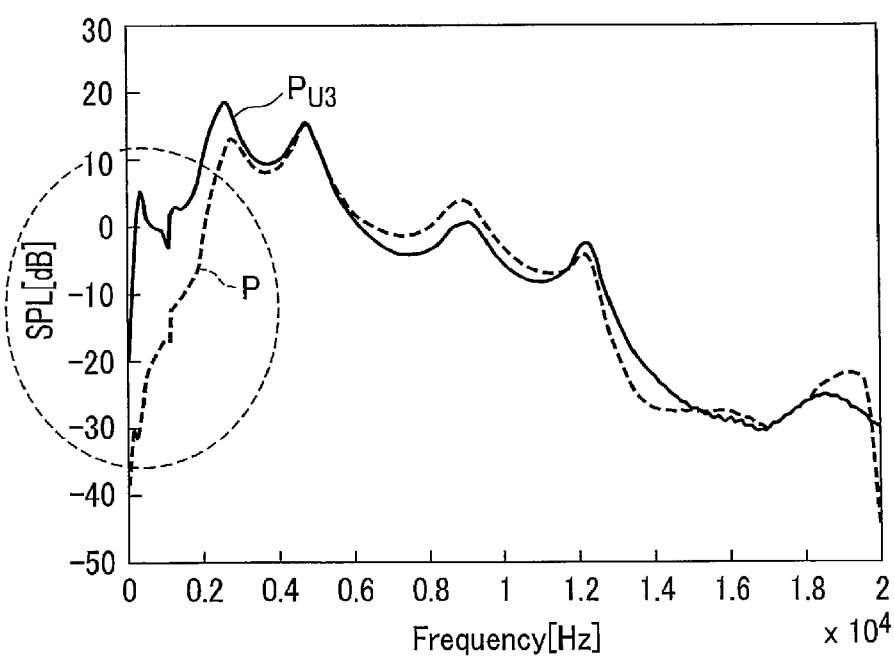
F I G. 22

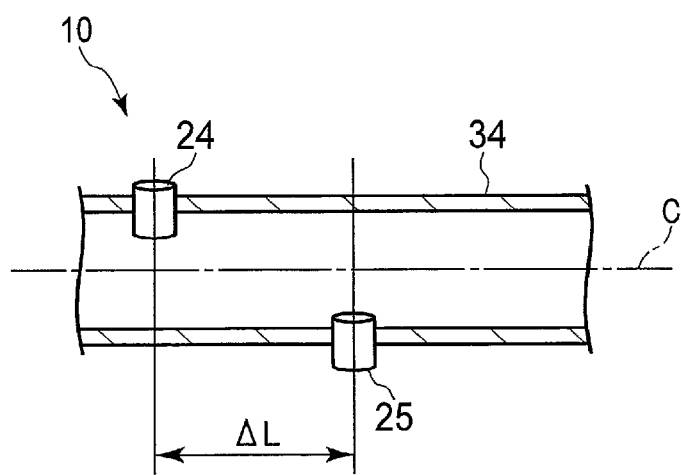
F I G. 26

ESTIMATING APPARATUS AND ESTIMATING METHOD

CROSS-REFERENCE TO RELATED APPLICATIONS

This application is based upon and claims the benefit of priority from Japanese Patent Application No. 2019-049882, filed Mar. 18, 2019, the entire contents of all of which are incorporated herein by reference.

FIELD

Embodiments described herein relate generally to an estimating apparatus and estimating method that estimate the resonance frequency of a tube such as a cooling pipe used for precision equipment, industrial facilities, OA equipment, and the like.

BACKGROUND

When a vibration source such as a compressor is connected to a main unit via a pipe, the vibrations excited by the vibration source propagate to the main unit via the tube to sometimes adversely affect the main unit. For example, the vibrations generated by the vibration source excite resonance inside the tube as acoustic excitation, are resonantly amplified, and propagate. In addition, the vibrations generated by the excitation source excite, as solid excitation, the tube surface and propagate as resonance amplification. As a result, the vibration level increases via the tube, and the vibrations of the tube act as an excitation force to induce vibrations of the main unit on the downstream side. It is necessary especially for precision equipment to suppress vibrations caused by disturbance, and hence there are demands for a technique of suppressing such vibrations.

The resonance of a tube has almost no influence depending on its material, and the resonance caused by the flow of a fluid flowing in the tube sometimes has a strong influence. In such a case, properly specifying resonance frequencies generated in tubes makes it possible to take a countermeasure suitable for each frequency.

It is, however, difficult to observe internal resonance from the outer surface of a tube. In addition, a peripheral cover or another accessory often covers the downstream edge portion of a tube near a main unit at which a resonance characteristic corresponding to the excitation of the tube can be directly observed. This makes it difficult to easily measure resonance characteristics at the downstream edge portion of the tube.

BRIEF DESCRIPTION OF THE DRAWINGS

FIG. 1 is a view schematically showing an excitation source, a main unit, and a tube which were used in a first preliminary test;

FIG. 2 is a view showing a tube imitating the tube shown in FIG. 1, an excitation source, an excitation source space, and a main unit;

FIG. 5 is a graph showing the sound pressure level $P_E$ at the downstream edge portion of the tube shown in FIG. 2 and a sound pressure level $P_{X=15}$ at distance X=15 mm from the excitation source space exit;

FIG. 6 is a view schematically showing an excitation source, a main unit, and a tube which were used in a second preliminary test;

FIG. 7 is a graph showing sound pressure levels at the downstream edge portion of the tube shown in FIG. 6 when $\alpha=10$;

FIG. 8 is a graph showing sound pressure levels at the downstream edge portion of the tube shown in FIG. 6 when $\alpha=100$;

FIG. 13 is a graph showing the gain characteristic of the transfer function of the filter processing unit (correction filter G) of the estimating apparatus when traveling-wave gain=reflected-wave gain;

FIG. 14 is a graph showing the phase characteristic of the transfer function of the filter processing unit (correction filter G) of the estimating apparatus when traveling-wave gain=reflected-wave gain;

FIG. 15 is a graph showing the sound pressure level of a reflected wave after the removal of a traveling wave which is obtained by the analyzer of the estimating apparatus when traveling-wave gain=reflected-wave gain;

FIG. 16 is a graph showing the sound pressure levels acquired by the first and second pressure sensors of the estimating apparatus shown in FIG. 11 when reflected-wave gain=half of traveling-wave gain;

FIG. 17 is a graph showing the gain characteristic of the transfer function of the filter processing unit (correction filter G) of the estimating apparatus when reflected-wave gain=half of traveling-wave gain;

FIG. 18 is a graph showing the phase characteristic of the transfer function of the filter processing unit (correction filter G) of the estimating apparatus when traveling-wave gain=half of reflected-wave gain;

FIG. 21 is a graph showing the sound pressure levels acquired by the first and second pressure sensors of the estimating apparatus shown in FIG. 20;

FIG. 22 is a graph showing the sound pressure levels acquired by the third pressure sensor of the estimating apparatus shown in FIG. 20 and the sound pressure level of a reflected wave after the removal of a traveling wave which was obtained by the analyzer;

FIG. 26 is a view schematically showing modifications of the estimating apparatuses according to the third and fourth embodiments;

DETAILED DESCRIPTION

Figure 3:
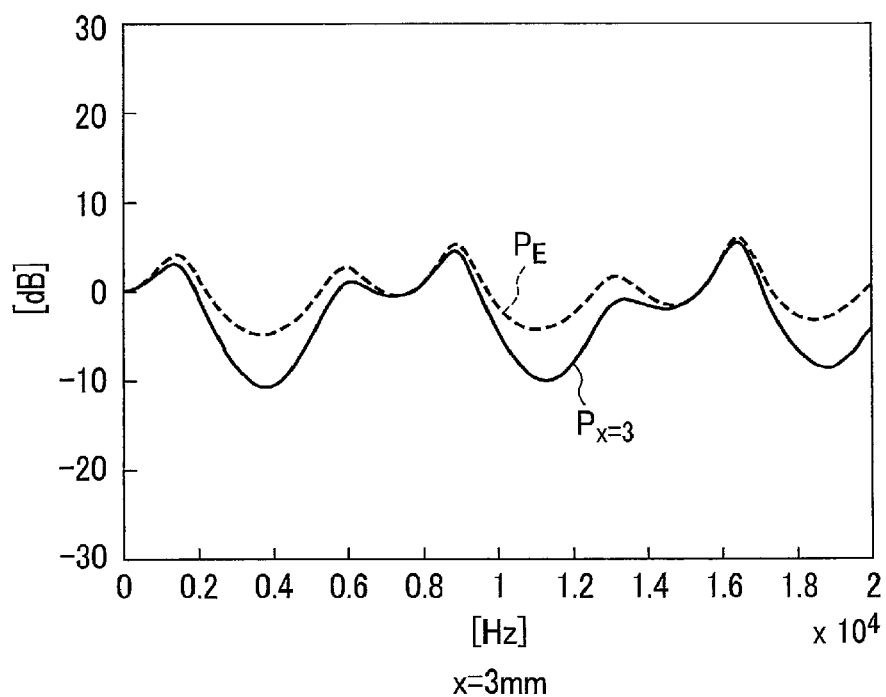
FIG. 3 is a graph showing a sound pressure level $P_E$ at the downstream edge portion of the tube shown in FIG. 2 and a sound pressure level $P_{X=3}$ at distance X=3 mm from an excitation source space exit.

An estimating apparatus for estimating the resonance frequency characteristic of a tube according to characteristic of a tube according to embodiments will be described below with reference to the accompanying drawings. In a structure in which an excitation source is coupled to a main unit via a tube, for example, a tube for feeding cooling water, the vibrations of the excitation source propagate to the main unit via the tube and sometimes adversely affect various types of precision measurement with the main unit. The estimating apparatus according to this embodiment can estimate the resonance frequency characteristic of the tube which is an excitation characteristic concerning the excitation of the main unit, especially a resonance frequency characteristic at the downstream edge portion which is the connecting portion between the tube and the main unit. This makes it possible to take a proper countermeasure suitable for each frequency to prevent vibrations from propagating to the main unit.

Each drawing is schematic or conceptual and the relationship between the thickness and the width of each part and the size ratio between each part are not necessarily the same as actual ones. In addition, even when the same portions are shown, the portions are sometimes shown in different dimensions and ratios depending on the drawings. Note that in this specification and the respective drawings, the same reference numerals denote the same components described with reference to the drawings already referred to. A detailed description of such components will be omitted as appropriate.

To solve above described problem by at least one of the embodiments is to provide an estimating apparatus and estimating method that can estimate, or the upstream side, a resonance frequency characteristic at the downstream edge portion of a tube.

According to one embodiment, an estimating apparatus includes an insertion tube, a first pressure sensor, a second pressure sensor, a filter processing unit, an adder, and an analyzer. The insertion tube is detachably mounted midway along a coupling tube that couples an excitation source to a main unit which is subjected to vibrations propagated via the coupling tube. The first pressure sensor is provided inside the insertion tube at a distance L from an exit of an excitation source space housing the excitation source. The second pressure sensor is provided inside the insertion tube at a distance $\Delta L$ from the first pressure sensor. The filter processing unit performs filter processing represented by $$G = -e^{-jk\Delta L}$$

with respect to a first signal obtained by the first pressure sensor. The adder adds a filtered signal and a second signal obtained by the second pressure sensor. The filtered signal is the first signal having undergone filter processing by the filter processing unit. The analyzer analyzes a frequency of an added signal obtained by the adder to estimate a resonance frequency characteristic at a downstream edge portion of the coupling tube. The added signal originates from the first signal and the second signal.

[First Preliminary Test]

A tube 13 that connects an excitation source 11 to a main unit 12 includes, for example, a plurality of tube portions having different lengths and inner diameters as shown in FIG. 1 and joint portions that connect the tube portions to each other. The tube 13 has a downstream edge portion 13A as a joint portion connected to the main unit 12. Although sound pressures with all the resonance frequencies are excited at the downstream edge portion 13A, a sound pressure in the tube 13 has nodes at the midway positions of the tube 13. FIG. 3 shows the result obtained by calculation based on the imitation of the tube 13 in FIG. 1 with the tube path shown in FIG. 2 for the sake of the simplicity of the structure. An excitation source space 14 includes a first tube portion 15 having a diameter D1 and a length L1, a second tube portion 16 having a diameter D2 and a length L2, and a third tube portion 17 having a diameter D3 and a length L3.

Assume that the tube 13 has a fourth tube portion 18 having a predetermined diameter D4 and a length L4.

Figure 4:
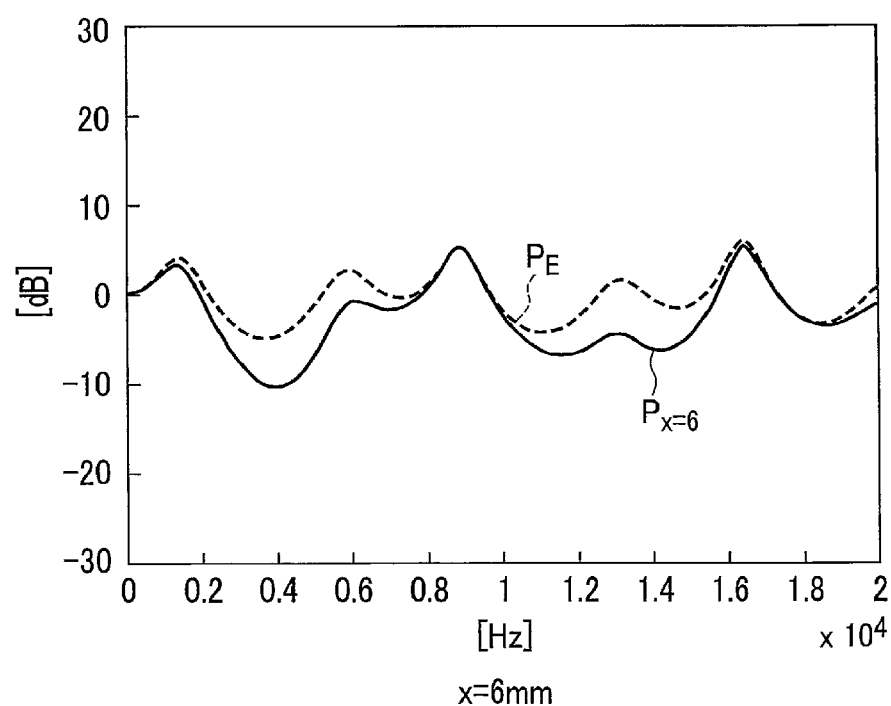
FIG. 4 is a graph showing the sound pressure level $P_E$ at the downstream edge portion of the tube shown in FIG. 2 and a sound pressure level $P_{X=6}$ at distance X=6 mm from the excitation source space exit.

Assume that in this case, D1=10.5 mm, L1=3 mm, D2=3 mm, L2=4 mm, D3=6 mm, L3=3 mm, D4=7 mm, and L4=25 mm. In addition, calculation was performed when a medium passing through the tube 13 was air, the sound velocity was 340 m/s, and the density of a medium was 1.2. FIGS. 3, 4, and 5 show the results. As shown in FIG. 3, a downstream edge portion sound pressure (a sound pressure at a reflection end) $P_E$ which is a sound pressure in the tube 13 at the downstream edge portion 13A is excited at all frequencies (resonance frequencies) corresponding to the excitation characteristic of the main unit 12. Note that in this preliminary test, the downstream edge sound pressure $P_E$ was measured upon installing a pressure sensor at the downstream edge portion 13A of the connecting portion with the main unit 12 at which any pressure sensor (microphone or sound pressure sensor) cannot be installed.

At each measurement point at a distance X from an excitation source space exit 14A, the resonance frequency gain of intra-tube sound pressure greatly changes depending on the distance X. That is, the gain of each of pressure sound $P_{X=3}$ at an observation point at distance X=3 mm, pressure sound $P_{X=6}$ at an observation point at distance X=6 mm and pressure sound $P_{X=15}$ at an observation point at distance X=15 mm greatly decreases at each resonance frequency. For this reason, a resonance frequency at the downstream edge portion 13A cannot be properly grasped at a midway position of the tube 13. It is therefore possible to understand from the result in this preliminary test that a proper excitation characteristic applied to the main unit 12 cannot be estimated at a midway position (upstream side) of the tube 13.

[Second Preliminary Test]

The tube 13 (tubing) of the actual equipment has particularly a plurality of tube portions coupled to each other via a plurality of joint portions. Accordingly, it is difficult to estimate acoustic impedance and reflectances at the joint portions. Assume that, as shown in FIG. 6, the tube 13 of the actual equipment includes the first tube portion 15 having length L1=0.7 m, the second tube portion 16 having L2=1.8 m, a first joint portion 21 that connects the first tube portion 15 to the second tube portion 16, and a second joint portion 22 (downstream edge portion 13A) connected to the downstream side of the second tube portion 16. In this case, a sound pressure at the downstream edge portion 13A changes depending on the acoustic impedances of the first joint portion 21 and the second joint portion 22. A sound pressure at the downstream edge portion 13A of the tube 13 assumed to be used in this actual equipment was measured with a pressure sensor set at the downstream edge portion 13A.

If the acoustic impedance of the first joint portion 21 and the second joint portion 22 is defined by a magnification $\alpha$, the resonance frequency changes depending on the magnitude of $\alpha$.

$$Z_U = \alpha \cdot \rho c$$

Figure 9:
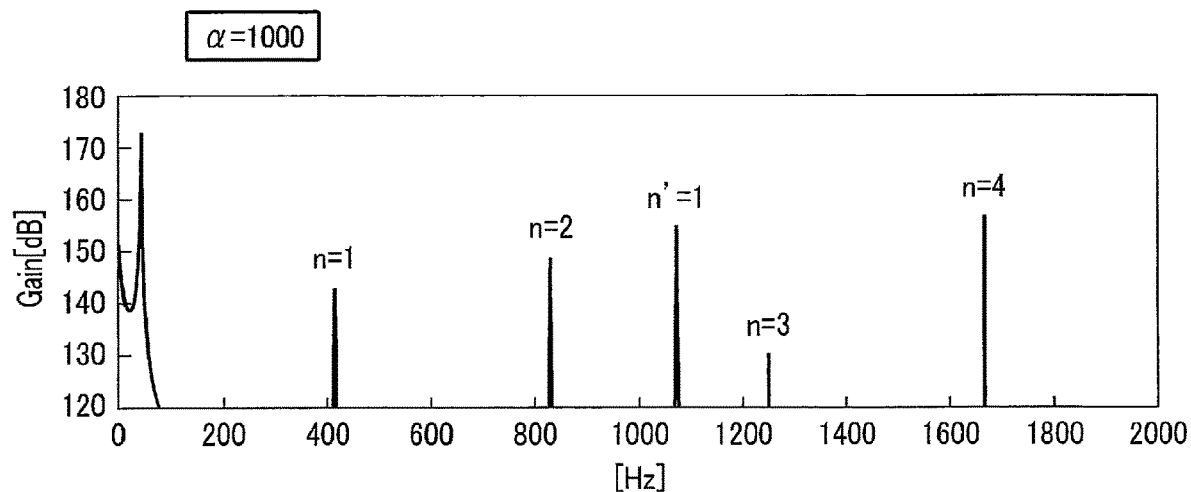
FIG. 9 is a graph showing sound pressure levels at the downstream edge portion of the tube shown in FIG. 6 when $\alpha=1000$.

For example, as indicated by the sound pressure measurement result shown in FIG. 9 under the condition of $\alpha$=1,000, an increase in $\alpha$ increases the resonance frequency to which the first tube portion 15 (L1=0.7 m) singly contributes and the resonance frequency to which the second tube portion 16 (L2=1.8 m) singly contributes. Referring to FIG. 9, a peak (fundamental harmonic: n'=1) of the resonance frequency to which the second tube portion 16 singly contributes appears near 1,070 kHz, and peaks of the resonance frequency to which the first tube portion 15 singly contributes appear near 420 kHz (fundamental harmonic: n=1), near 830 kHz (second harmonic: n=2), near 1,250 kHz (third harmonic: n=3), and near 1,670 kHz (fourth harmonic: n=4).

In contrast, according to the sound pressure measurement result shown in FIG. 7 under the condition of $\alpha$=10 and the sound pressure measurement result shown in FIG. 8 under the condition of $\alpha$=100, resonance frequency peaks appear, which are difficult to explain in terms of the length of the first tube portion 15 alone and the length of the second tube portion 16 alone. Accordingly, the results of this preliminary test indicate that it is difficult to predict an actual sound pressure characteristic at the downstream edge portion 13A of the tube 13 from the upstream side of the tube 13 or a midway position of the tube 13 because of changes in resonance frequency at the downstream edge portion 13A of the tube 13 depending on the value of $\alpha$. Vibrations having the same frequency as the resonance frequency at the downstream edge portion 13A are applied as an excitation force from the inside of the tube 13 to the main unit 12.

[Third Preliminary Test]

Figure 10:
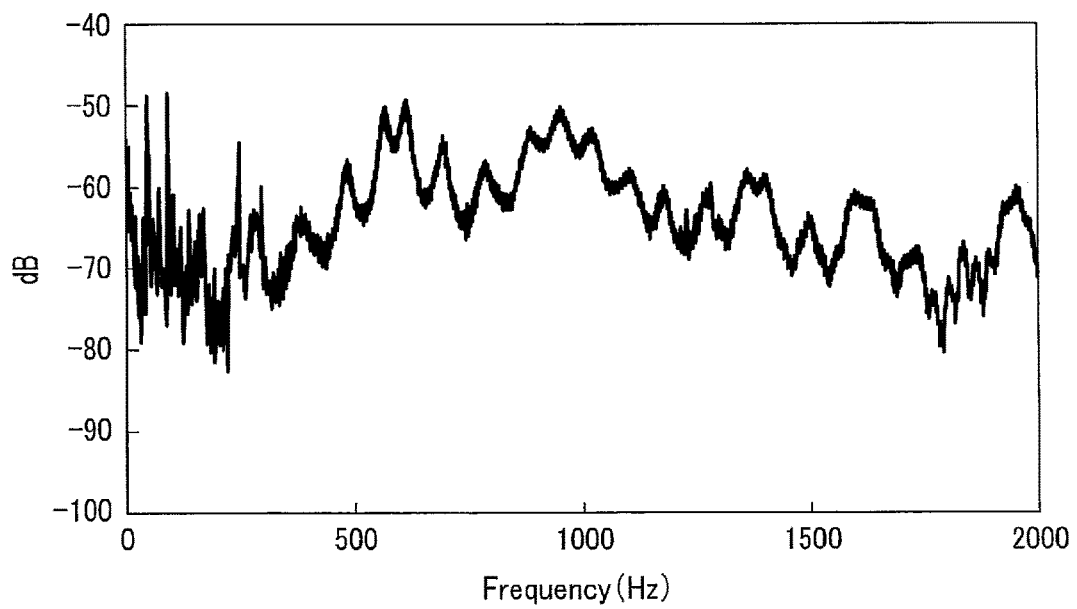
FIG. 10 is a graph showing sound pressure levels (resonance frequency characteristic) at the downstream edge portion of a tube in a third preliminary test.

In the third preliminary test, the tube 13 was connected to the main unit 12, the excitation source 11 (for example, a loudspeaker) was installed at an upstream edge portion 13B of the tube 13, and a random signal was input to the excitation source 11 (loudspeaker) to generate noise. A sound pressure level at the downstream edge portion 13A of the tube 13 was measured with a pressure sensor installed at the downstream edge portion 13A. FIG. 10 shows the resonance frequency characteristic of sound pressures at the downstream edge portion 13A of the tube 13 in the third preliminary test. Vibrations corresponding to this resonance frequency characteristic propagate as mechanical vibrations to the main unit 12 and become an excitation force to vibrate the main unit 12. Properly specifying the resonance frequency generated in the tube 13 makes it possible to take a countermeasure (for example, placing an obstacle in the tube 13 to reduce resonance) suitable for each frequency.

The following embodiment proposes a technique of estimating an excitation characteristic (a resonance frequency at the downstream edge portion 13A of the tube 13) that causes the main unit 12 to vibrate by using two pressure sensors (microphones, sensors, pressure-sensitive sensors, piezoelectric sensors, or other types of devices that can measure sound pressures (pressures)).

First Embodiment

Figure 11:
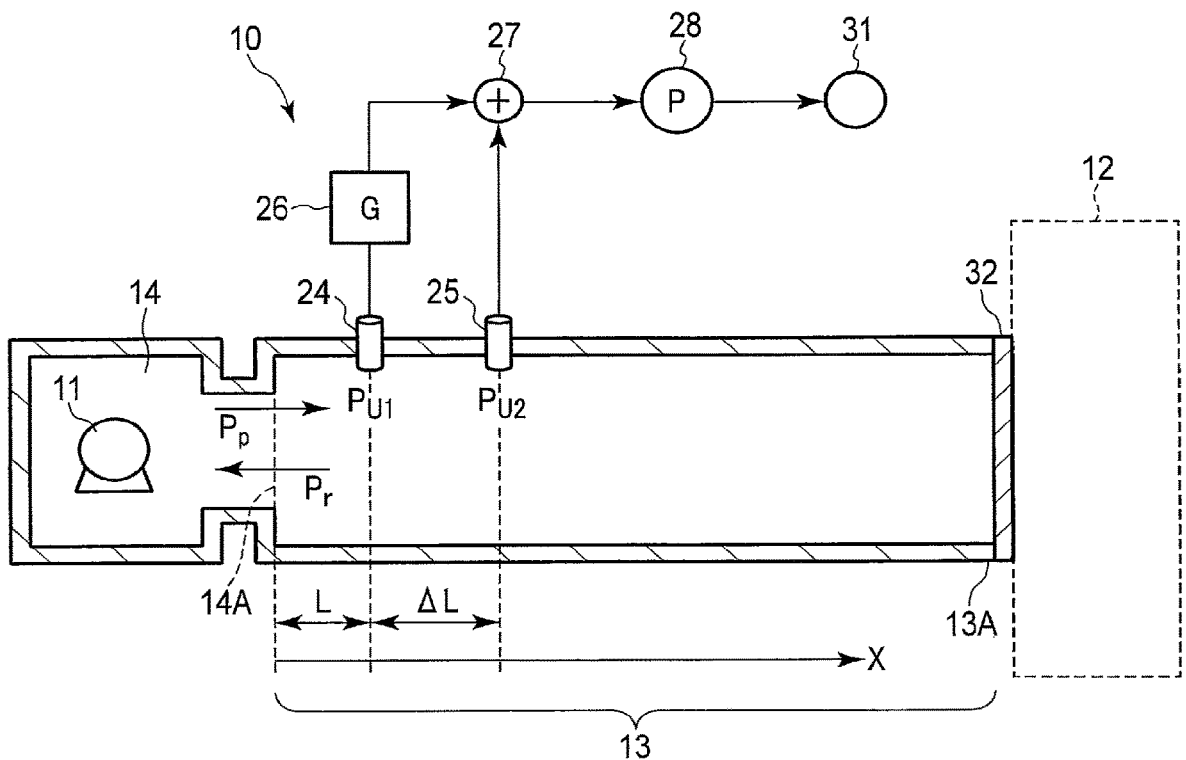
FIG. 11 is a view schematically showing an estimating apparatus for estimating a resonance frequency characteristic according to the first embodiment.

FIG. 11 schematically shows an estimating apparatus 10 for estimating a resonance frequency characteristic according to the first embodiment. The estimating apparatus 10 includes a housing 23, an excitation source space 14 provided inside the housing 23, an excitation source 11 provided in the excitation source space 14, a main unit 12, a metal tube 13 (tubing) that connects the excitation source space exit 14A to the main unit 12, a first pressure sensor 24 provided midway along the tube 13 at a distance L from an excitation source space exit 14A, a second pressure sensor 25 provided midway along the tube 13 at a distance $\Delta L$ from the first pressure sensor 24, a filter processing unit 26 (correction filter G or filter) for filtering a signal from the first pressure sensor 24, an adder 27 (addition circuit) for adding the signal obtained by correcting a signal from the first pressure sensor 24 by using the filter processing unit 26 and a signal from the second pressure sensor 25, an analyzer 28 (analysis circuit) for analyzing the frequency of the signal obtained by the adder 27, and a display 31 for displaying the analysis result obtained by the analyzer 28. As in the third embodiment described above, an insertion tube 34 may be configured to be inserted in a joint portion or the like of the tube 13, and the first pressure sensor 24 and the second pressure sensor 25 may be arranged in the insertion tube 34. The first pressure sensor 24 and the second pressure sensor 25 each may be formed from a microphone, a sensor (pressure-sensitive sensor) capable of measuring a sound pressure, a piezoelectric sensor, or another type of device capable of measuring a sound pressure (pressure).

The excitation source 11 is formed from, for example, an air machine such as a fan or blower, a pump, or a compressor. The excitation source 11 generates predetermined vibrations and actuation sounds accompanying rotation or the like. A medium passing through the tube 13 may be an arbitrary fluid, gas such as air, or a liquid such as water or refrigerant. The following description will be made on the assumption that a medium passing through the tube 13 is air. The tube 13 is formed from, for example, iron so as to have a circular cylindrical form. The tube 13 can be formed from any material, such as stainless steel, aluminum, copper, or resin. The tube 13 may have a rectangular cylindrical form (duct form). The filter processing unit 26, the adder 27, and the analyzer 28 each are formed from a computer and numerical analytical software (for example, MATLAB) installed in the computer. As the filter processing unit 26, the adder 27, and the analyzer 28, commercially available analyzers and the like may be used.

<Derivation of Correction Filter G>

Letting $P_{U1}$ be a sound pressure from the first pressure sensor 24, $P_{U2}$ be a sound pressure from the second pressure sensor 25, $P_p$ be a traveling wave at the excitation source space exit 14A, and $P_r$ be a reflected wave at the excitation source space exit 14A, the sound pressures detected by the two pressure sensors are expressed by equations (1) and (2) given below. In this case, L represents the distance from the excitation source space exit 14A to the first pressure sensor 24 along the axial direction of the tube 13 and ΔL represents the distance from the first pressure sensor 24 to the second pressure sensor 25 along the axial direction of the tube 13. In each embodiment described below, other conditions are the same as those in the above preliminary tests.

$$P_{U1} = P_p e^{-jkL} + P_r e^{jkL} \quad (1)$$

$$P_{U2} = P_p e^{-jk(L+\Delta L)} + P_r e^{jk(L+\Delta L)} \quad (2)$$

where j is an imaginary unit and k is a wavenumber. A sound wave from the excitation source space exit 14A, which includes multiple reflections in this space, propagates as a traveling wave in the tube 13 up to the downstream side, while passing through the two pressure sensors. Accordingly, the correction filter G (sound pressure after processing by two pressure sensors=0) for removing this traveling wave is expressed as follows:

$$P = P_{U1} \cdot G + P_{U2} \to 0 \quad (3)$$

$$\therefore G = -\frac{P_{U2}}{P_{U1}} = -\frac{P_p e^{-jk(L+\Delta L)} + P_r e^{jk(L+\Delta L)}}{P_p e^{-jkL} + P_r e^{jkL}}$$

Assume that a direct wave has large contribution at the excitation source space exit 14A, and a reflected wave from the downstream edge portion 13A is weak.

$$P_p \gg P_r$$

In this case, the correction filter G for the filter processing unit 26 is expressed by equation (4), and a time delay corresponding to the interval between the first pressure sensor 24 and the second pressure sensor 25 occurs. In order to obtain the sound pressure of the reflected wave by removing the traveling wave from the excitation source space exit 14A, (sound pressure of first pressure sensor 24)×(correction filter G) may be deleted from the sound pressure from the second pressure sensor 25.

$$\therefore G \approx -\frac{P_p e^{-jk(L+\Delta L)}}{P_p e^{-jkL}} = -e^{-jk\Delta L} \quad (4)$$

$$\therefore P = P_{U2} - P_{U1} e^{-jk\Delta L} \quad (5)$$

In contrast, when the correction filter G derived by assuming that (traveling wave)××(reflected wave) while a reflected wave cannot be neglected at the excitation source space exit 14A, the following equation holds. That is, the traveling wave can be removed, and only the reflected wave is left.

$$P = P_{U1} \cdot G + P_{U2} \quad (6)$$

$$= -P_{U1} \cdot e^{-jk\Delta L} + P_{U2}$$

$$= P_p(-e^{-jk(L+\Delta L)} + e^{-jk(L+\Delta L)}) +$$

$$P_r(-e^{jk(L-\Delta L)} + e^{jk(L+\Delta L)})$$

$$= P_r e^{jkL}(e^{jk\Delta L} - e^{-jk\Delta L})$$

$$= P_r e^{jkL} \cdot 2j\sin k\Delta L$$

$$= 2P_r e^{j(kL+\frac{\pi}{2})} \sin k\Delta L$$

Accordingly, using this simple, pragmatic correction method can remove a direct wave and extract only a reflected wave necessary for correction.

<Removal of Sound Pressure Node (Notch)>

A sound pressure node (notch) of a sound pressure P after filter correction appears at the following frequency:

$$P = e^{j(kL+\frac{\pi}{2})} \sin k\Delta = 0 \to \cos\left(kL + \frac{\pi}{2}\right) \sin k\Delta = 0 \quad (7)$$

$$\therefore kL = (n-1)\pi, \; k\Delta L = (n-1)\pi$$

$$\therefore f_n = \frac{(n-1)c}{2L}, \frac{(n-1)c}{2\Delta L}$$

$$n = 1, 2, \ldots \quad \because k = \frac{2\pi f}{c}$$

Accordingly, in order to prevent any sound pressure node from appearing in a target frequency range, assuming that the target upper limit is 10 kHz or more ($f_1$=10 kHz) and sound velocity C=340 m/s, the pressure sensor interval ΔL needs to be 17 mm or less according to equation (8). In this embodiment, ΔL=12 mm.

$$\Delta L \le \frac{(n-1)c}{2f_n} = 0.017 \quad (8)$$

In addition, calculation is performed under the following strict condition, when (traveling-wave gain)=(reflected-wave gain):

$$\therefore P_r = P_p$$

Figure 12:
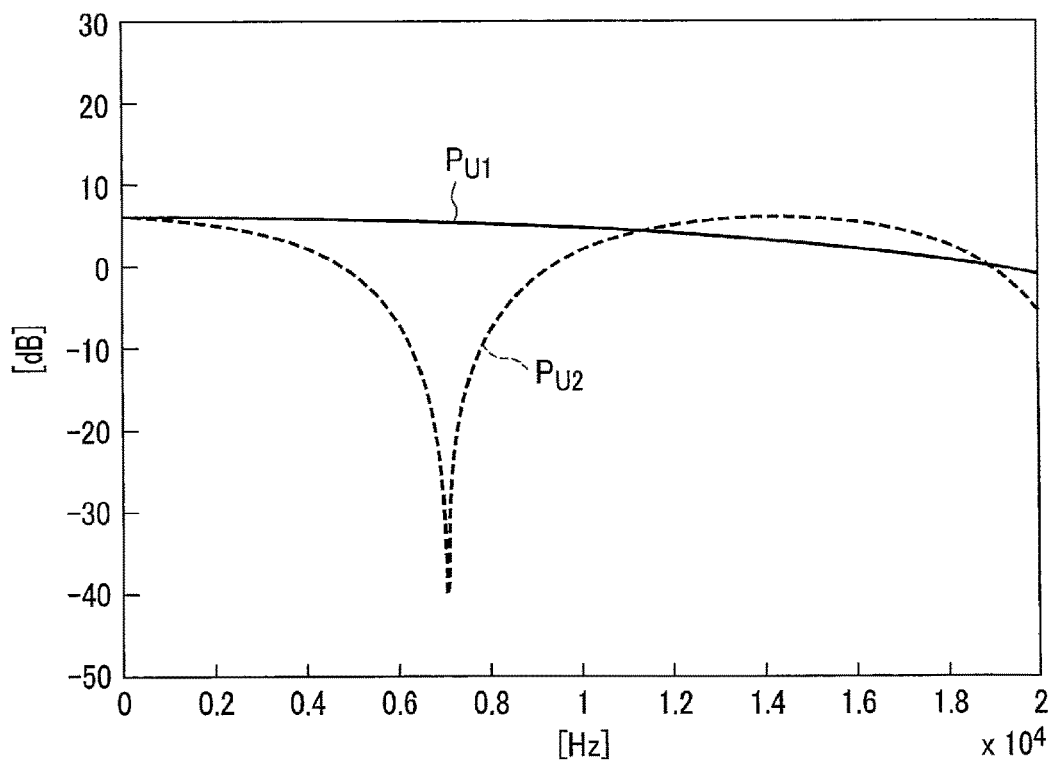
FIG. 12 is a graph showing the sound pressure levels acquired by the first and second pressure sensors of the estimating apparatus shown in FIG. 11 when traveling-wave gain=reflected-wave gain.

In this case, the sound pressure $P_{U1}$ from the first pressure sensor 24 and the sound pressure $P_{U2}$ from the second pressure sensor 25 have sound pressure nodes (notches) appearing at the following frequencies. FIG. 12 shows this characteristic.

$$P_{U1} = P_p e^{-jkL} + P_r e^{jkL} \quad (10)$$

$$= 2P_p \cos kL$$

$$P_{U1} = 0$$

$$\therefore f_n = \frac{(2n-1)c}{4L}$$

When L=3 mm and ΔL=9 mm, $f_1$=28 kHz according to equation (10).

$$P_{U2} = P_p e^{-jk(L+\Delta L)} + P_r e^{jk(L+\Delta L)} \quad (11)$$

$$= 2P_p \cos k(L+\Delta L)$$

$$P_{U2} = 0$$

$$\therefore f_n = \frac{(2n-1)c}{4(L+\Delta L)}$$

When L=3 mm and ΔL=9 mm, $f_1$=7 kHz according to equation (11). According to equation (12), in order to prevent a sound pressure node from appearing in the target frequency range, the second pressure sensor 25 needs to be placed within 8.5 mm from the excitation source space exit. When the first pressure sensor 24 is located at 3 mm (L=3 mm) from the excitation source space exit 14A, the interval ΔL between the first pressure sensor 24 and the second pressure sensor 25 needs to be ΔL=5.5 mm or less (f=10 kHz).

$$L + \Delta L < \frac{c}{4f} = 0.0085 \qquad (12)$$

Note, however, that it is necessary to satisfy the following condition from the viewpoint of a spatial resolution. In this case, Δf is a sampling frequency.

$$N = \text{round} \frac{\Delta L \Delta f}{c} \geq 1 \rightarrow \therefore \Delta L > \frac{c}{\Delta f} \qquad (13)$$

According to equation (13), when sampling frequency Δf=44.1 kHz, ΔL>7.7 mm is required. Accordingly, assuming that ΔL>7.7 mm, the upper limit of target frequencies is 7.94 kHz according to equation (14), under the condition distance L=3 mm from the excitation source space exit 14A to the first pressure sensor 24.

$$f_1 = \frac{c}{4(L+\Delta L)} = 7.94 \text{ kHz} \qquad (14)$$

FIG. 13 shows the gain characteristic of the correction filter G for removing a traveling wave in this case. FIG. 14 shows a phase characteristic.

$$G = -\frac{P_{U2}}{P_{U1}} = -\frac{P_p e^{-jk(L+\Delta L)} + P_r e^{jk(L+\Delta L)}}{P_p e^{-jkL} + P_r e^{jkL}} \qquad (15)$$

The pressure sound P after filter correction (after the removal of a traveling wave) has a first-order (n=2) sound pressure node (notch) appearing at 18.8 kHz as indicated by equation (16) given below. FIG. 15 shows the characteristic of the sound pressure P in this case.

$$P = P_{U1} \cdot G + P_{U2} \qquad (16)$$
$$f = \frac{c}{2\Delta L} = 18.8 \text{ kHz} \because \Delta L < L$$

As is obvious from FIG. 15, setting conditions in this manner can prevent any notch from appearing in the target frequency range surrounded by the broken-line rectangle, thus obtaining an almost flat characteristic. Accordingly, the estimating method (two-pressure-sensor removal method) using the first pressure sensor 24 and the second pressure sensor 25, that is, the method based on equations (5) and (6), can remove traveling wave components from an upstream side including multiply reflected waves, thereby estimating the resonance frequency of a downstream edge portion 13A of the tube 13 (that is, an excitation characteristic for the main unit 12) from the upstream side of the tube 13 (a midway position of the tube 13).

Figure 19:
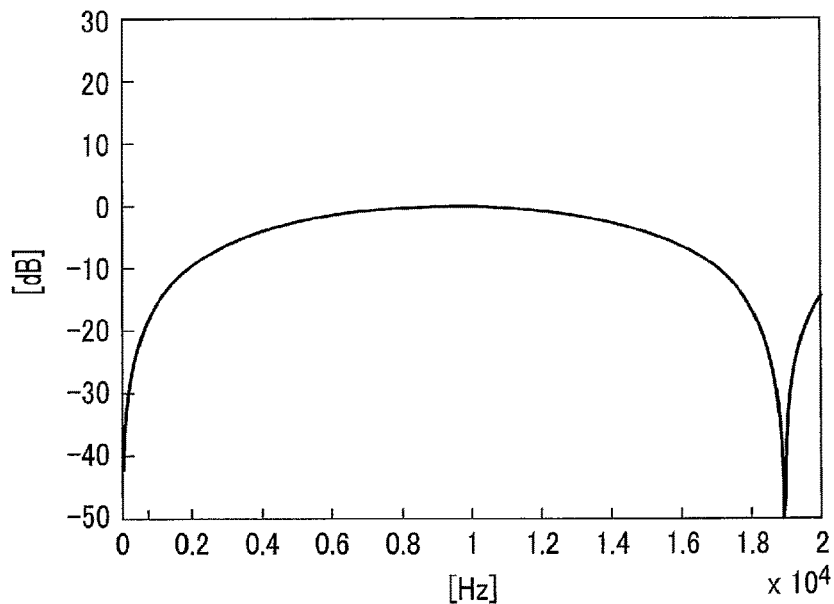
FIG. 19 is a graph showing the sound pressure levels acquired by the first and second pressure sensors of the estimating apparatus shown in FIG. 11 when reflected-wave gain=half of traveling-wave gain.

FIGS. 16, 17, 18, and 19 each show the result obtained by calculation assuming that (reflected-wave gain)=(half of traveling-wave gain). FIG. 16 shows the sound pressure $P_{U1}$ of the first pressure sensor 24 and the sound pressure $P_{U2}$ of the second pressure sensor 25. FIG. 17 shows the gain characteristic of the correction filter G. FIG. 18 shows the phase characteristic of the correction filter G. FIG. 19 shows the result concerning the sound pressure P after correction. Comparison between the results shown in FIGS. 12, 13, 14, and 15 indicates that the gain differences weaken the sound pressure interference to reduce sound pressure nodes (notches) concerning the second pressure sensor 25 and notches concerning the filter G, but the sound pressure P does not change much. Therefore, it is important how to arrange the first pressure sensor 24 and the second pressure sensor 25 so as to prevent any notch from appearing in a target frequency range.

The second to fourth embodiments will be described below, mainly focusing on differences from the first embodiment, and illustrations and descriptions of portions common to those in the first embodiment will be omitted.

Second Embodiment

Figure 20:
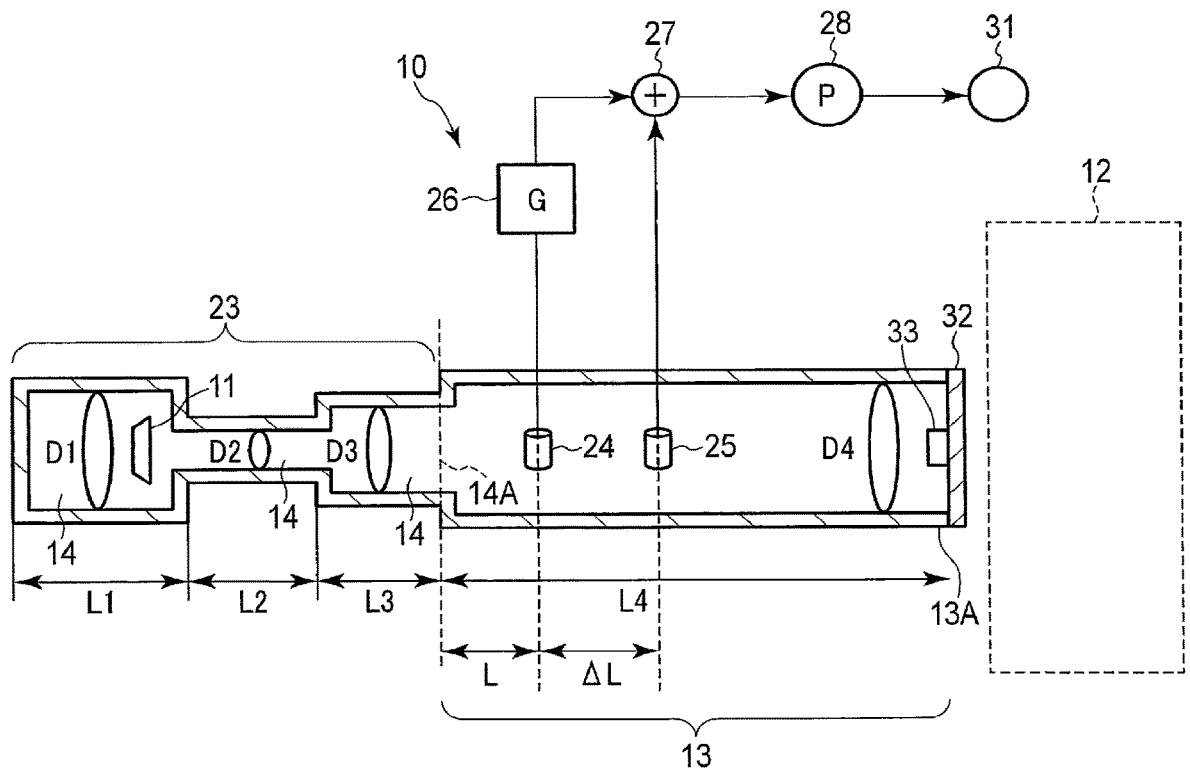
FIG. 20 is a view schematically showing an estimating apparatus for estimating a resonance frequency characteristic according to the second embodiment.

An estimating apparatus 10 for estimating a resonance frequency characteristic according to the second embodiment will be described with reference to FIG. 20.

The estimating apparatus 10 includes a box-shaped housing 23, an excitation source space 14 provided inside the housing 23, an excitation source 11 provided in the excitation source space 14, a main unit 12, a metal tube 13 (tubing) that connects the excitation source space exit 14A to the main unit 12, a first pressure sensor 24 provided midway along the tube 13 at a distance L from an excitation source space exit 14A, a second pressure sensor 25 provided midway along the tube 13 at a distance ΔL from the first pressure sensor 24, a filter processing unit 26 (correction filter G or filter) for filtering a signal from the first pressure sensor 24, an adder 27 (addition circuit) for adding the signal obtained by correcting a signal from the first pressure sensor 24 by using the filter processing unit 26 and a signal from the second pressure sensor 25, an analyzer 28 (analysis circuit) for analyzing the frequency of the signal obtained by the adder 27, and a display 31 for displaying the analysis result obtained by the analyzer 28.

In this case, D1=10.5 mm, L1=3 mm, D2=3 mm, L2=4 mm, D3=6 mm, and L3=3 mm. Assume that the tube 13 has a dimeter D4 of 7 mm, the tube 13 has a length L4 of 18 mm, the distance X from the excitation source space exit 14A is 3 mm, and the distance ΔL from the first pressure sensor 24 to the second pressure sensor 25 is 9 mm. The calculation was performed assuming that a medium (fluid) passing through the tube 13 was air (gas), the sound velocity was 340 m/s, and the density of the medium was 1.2. A medium passing through the tube 13 may be a liquid other than air, such as water.

In this embodiment, the excitation source 11 is formed from a loudspeaker. The estimating apparatus 10 includes a transparent tape 32 imitating a reflection end and provided at a downstream edge portion 13A of the tube 13 and a third pressure sensor 33 provided on the tape 32. In the embodiment, the downstream edge portion 13A of the tube 13 is not connected to the actual main unit 12, and a resonance frequency (excitation characteristic) at the downstream edge portion 13A of the tube 13 is actually measured based on the sound pressure obtained by the third pressure sensor 33. The third pressure sensor 33 may be formed from a microphone, a sensor (pressure-sensitive sensor) capable of measuring a sound pressure, a piezoelectric sensor, or another type of device capable of measuring a sound pressure (pressure).

FIG. 21 shows the results concerning a sound pressure $P_{U1}$ acquired by the first pressure sensor 24 and a sound pressure $P_{U2}$ acquired by the second pressure sensor 25. A sound pressure node (notch) appears in the sound pressure $P_{U2}$ acquired by the second pressure sensor 25. Obviously, this characteristic is close to the characteristic shown in FIG. 12. The reason why resonance frequencies appear near 3 kHz and 5 kHz in FIG. 21, unlike in FIG. 12, is that the excitation source space 14 having a predetermined shape is connected to the upstream edge portion of the tube 13 to make the resonance frequencies of the overall space appear.

FIG. 22 shows a sound pressure $P_{U3}$ (a target value corresponding to an excitation characteristic) acquired by the third pressure sensor 33 and the characteristic of a sound pressure P (a sound pressure after removal of a traveling wave) processed by the adder 27 using the two-pressure-sensor removal method and analyzed by the analyzer 28.

Four resonance frequencies appear from 3 kHz to 13 kHz in the sound pressure $P_{U3}$ acquired by the third pressure sensor 33. Obviously, the sound pressure P obtained by the two-pressure-sensor removal method can reproduce a characteristic almost close to that of the sound pressure $P_{U3}$. As compared with FIG. 21, no resonance is measured near 13 kHz in the sound pressure $P_{U1}$ acquired by the first pressure sensor 24 in FIG. 21, and the three resonance frequencies appearing in the sound pressure $P_{U1}$ differ in gain ratio from the sound pressure $P_{U3}$ at the downstream edge portion 13A, which is the target value in FIG. 22. Although resonance appears near 13 kHz in the sound pressure $P_{U2}$ acquired by the second pressure sensor 25, no resonance appears near 9 kHz because of the influence of the characteristic of a notch near 8 kHz. In addition, the sound pressure P obtained by the two-pressure-sensor removal method rapidly decreases with a decrease in frequency in the region (low-frequency region) surrounded by the dotted circle. This is a basic characteristic of the two-pressure-sensor removal method shown in FIG. 15. In other words, in order to maintain the primary resonance gain near 3 kHz which is influenced by this characteristic, it is necessary to adjust, for example, the interval ΔL between the first pressure sensor 24 and the second pressure sensor 25.

As described above, the two-pressure-sensor removal method according to this embodiment can reproduce a sound pressure (excitation characteristic) at the downstream edge portion 13A of the tube 13, which cannot be reproduced by the sound pressure obtained by the single pressure sensor arranged midway along the tube 13. Even if the specifications of the excitation source space 14 and the acoustic characteristics (acoustic impedance characteristics such as reflectance and sound Absorption ratio) at the downstream edge portion 13A are unknown, it is greatly significant that the acoustic characteristics at the downstream edge portion 13A can be reproduced at the midway position (upstream side) of the tube 13. Accordingly, with regard to the tube 13 in actual equipment, even if acoustic characteristics at the downstream edge portion 13A connected to, for example, a compressor (excitation source 11) at an upstream edge portion 13B or the main unit 12 are unknown, the estimating apparatus 10 and the estimating method according to this embodiment are valid.

Modification of Second Embodiment

A modification of the estimating apparatus 10 and the estimating method according to the second embodiment will be described. This modification is the same as the second embodiment except that the material of the tube 13 is changed to a resin.

Figure 23:
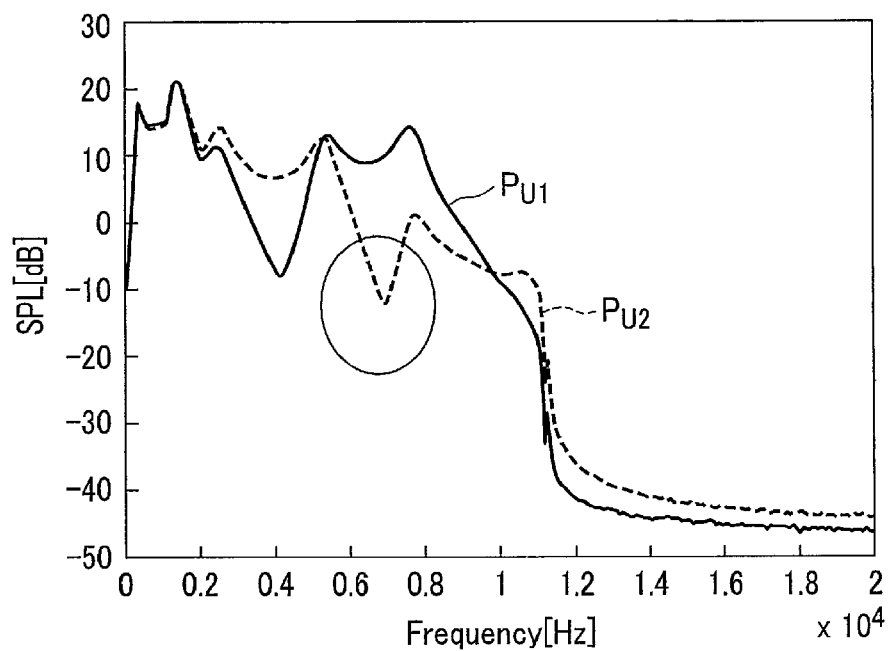
FIG. 23 is a graph showing the sound pressure levels acquired by the first and second pressure sensors of the estimating apparatus according to a modification of the second embodiment.
Figure 24:
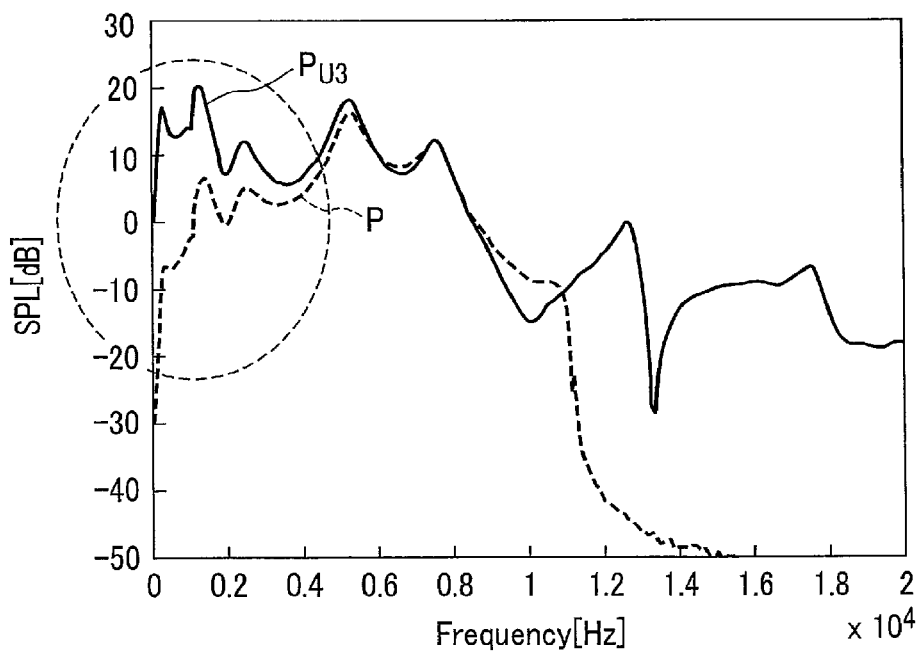
FIG. 24 is a graph showing the sound pressure levels acquired by the third pressure sensor of the estimating apparatus according to the second embodiment and the sound pressure level of a reflected wave after the removal of a traveling wave obtained by the analyzer.

FIG. 23 shows the sound pressure $P_{U2}$ acquired by the first pressure sensor 24 and the sound pressure $P_{U2}$ acquired by the second pressure sensor 25. FIG. 24 shows the results concerning the sound pressure $P_{U3}$ acquired by the third pressure sensor 33 and the sound pressure P obtained by the adder 27 and the analyzer 28 using the two-pressure-sensor removal method.

This modification exhibits almost the same tendency at that in the second embodiment. As compared with FIG. 21, FIG. 24 shows that the gain in the region (low-frequency region) surrounded by the broken-line circle decreases as a whole due to the influence of the above basic characteristic of the two-pressure-sensor removal method. As is obvious, however, the modification can also reproduce primary resonance at 5 kHz and secondary resonance at 8 kHz, which occur in the space in the tube 13.

Third Embodiment

Figure 25:
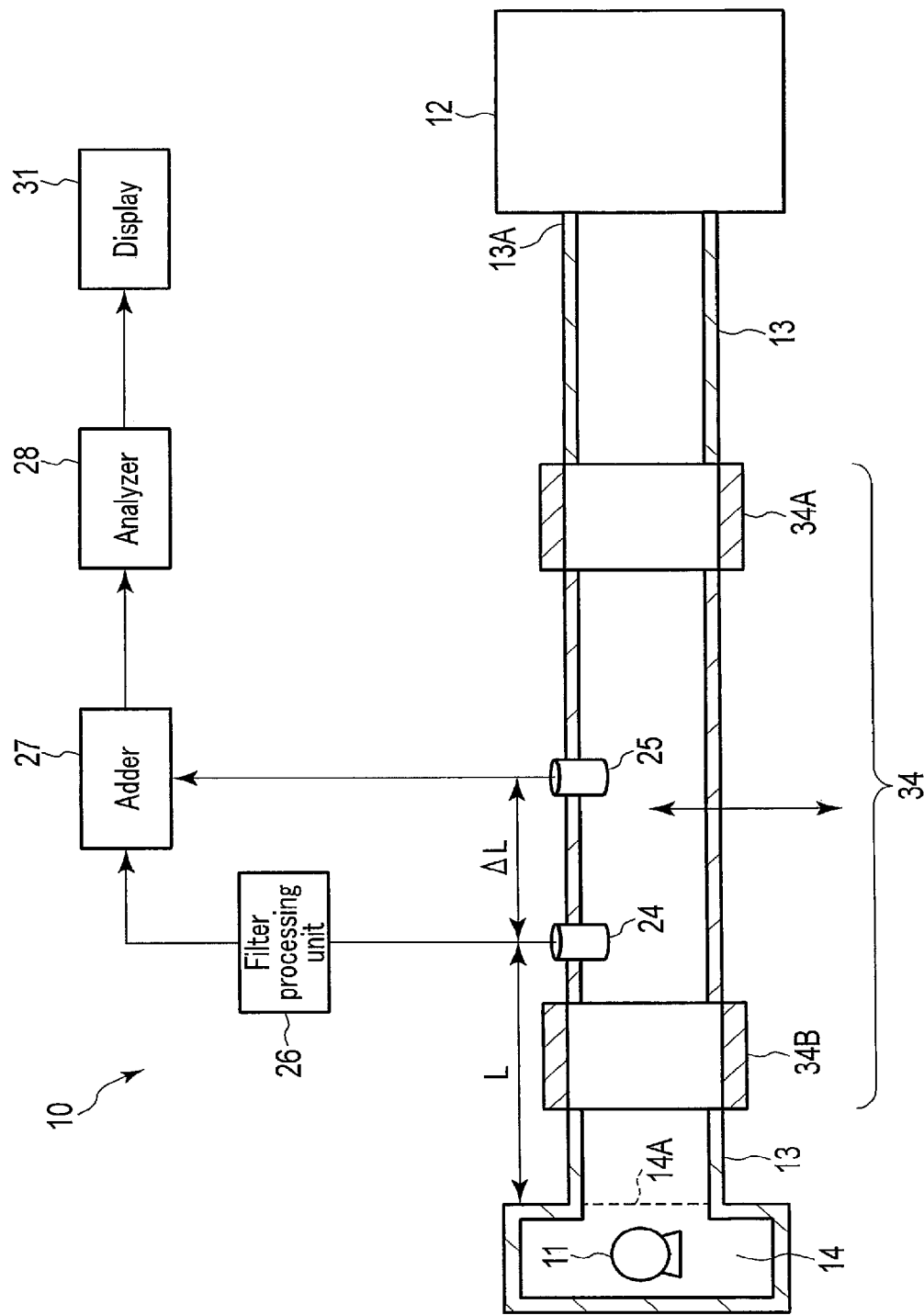
FIG. 25 is a view schematically showing an estimating apparatus for estimating a resonance frequency characteristic according to the third embodiment.

A estimating apparatus 10 for estimating a resonance frequency characteristic according to the third embodiment will be described with reference to FIG. 25.

The estimating apparatus 10 includes a box-shaped housing 23, an excitation source space 14 provided inside the housing 23, an excitation source 11 provided in the excitation source space 14, a main unit 12, a metal tube 13 (tubing) that connects an excitation source space exit 14A to the main unit 12, a detachable insertion tube 34 provided midway along the insertion tube 34, a first pressure sensor 24 provided midway along the insertion tube 34 at a distance L from the excitation source space exit 14A in the axial direction of the insertion tube 34, a second pressure sensor 25 provided midway along the insertion tube 34 at a distance ΔL from the first pressure sensor 24 in the axial direction of the insertion tube 34, a filter processing unit 26 (correction filter G or filter) for filtering a sound pressure signal from the first pressure sensor 24, an adder 27 (addition circuit) for adding the signal obtained by correcting the sound pressure signal from the first pressure sensor 24 by using the correction filter and a sound pressure signal from the second pressure sensor 25, an analyzer 28 (analysis circuit) for analyzing the frequency of the signal obtained by the adder 27, and a display 31 for displaying the analysis result obtained by the analyzer 28.

Alternatively, the concept of the estimating apparatus 10 may include the insertion tube 34, the first pressure sensor 24, the second pressure sensor 25, the filter processing unit 26, the adder 27, and analyzer 28 among the above components, and may not include the remaining components.

The insertion tube 34 includes a first connecting portion 34A connected to the tube 13 located on the downstream side and a second connecting portion 34B connected to the tube 13 located on the upstream side. The insertion tube 34 can be attached to the joint portion of the tube 13 by, for example, screwing or press fitting or detached from the tube 13.

The first pressure sensor 24 and the second pressure sensor 25 are provided in the insertion tube 34. The filter processing unit 26 is formed from the correction filter G according to the above embodiment, that is, equation (4).

A length L and a length ΔL are properly set so as to satisfy the following inequalities:

$$L + \Delta L < \frac{c}{4f} \quad (17)$$

where C is the sound velocity, C=340 m/s, and f is an observation target frequency.

$$\Delta L > \frac{c}{\Delta f} \quad (18)$$

where Δf is a sampling frequency.

An estimating method using the estimating apparatus 10 according to this embodiment will be described.

The insertion tube 34 is mounted midway along the tube 13 connecting the excitation source space exit 14A to the main unit 12, for example, at the position of a joint located midway along the tube 13. In this case, the first connecting portion 34A is connected to the tube 13 on the upstream side, and the second connecting portion 34B is connected to the tube 13 on the downstream side.

Subsequently, the first pressure sensor 24 acquires a sound pressure signal, and the second pressure sensor 25 acquires a sound pressure signal. The filter processing unit 26 performs the filter processing (correction filter G) according to equation (4) with respect to the sound pressure signal obtained by the first pressure sensor 24.

The adder 27 adds a sound pressure $P_{U1}$ from the first pressure sensor 24, which is filtered by the filter processing unit 26, and a sound pressure $P_{U2}$ from the second pressure sensor 25.

$$P = P_{U2} - P_{U1} \cdot e^{-jk\Delta L}$$

The sound pressure signal obtained by the addition by the adder 27 is the signal from which the traveling wave is removed. Only the sound pressure of the reflected wave is reflected in this signal. The pressure sound signal obtained by the addition using the adder 27 is sent to the analyzer 28. The analyzer 28 then performs frequency analysis of the signal. The display 31 then displays the result. This makes it possible to estimate a resonance frequency at a downstream edge portion 13A of the tube 13 based on the information acquired on the upstream side.

According to the third embodiment, the following holds. The estimating apparatus 10 estimates a resonance frequency characteristic at the downstream edge portion 13A of the tube 13 that couples the excitation source 11 to the main unit 12. The estimating apparatus 10 includes the detachable insertion tube 34 provided midway along the tube 13, the first pressure sensor 24 provided inside the insertion tube 34 at the distance L from the excitation source space exit 14A in which the excitation source 11 is housed, the second pressure sensor 25 provided inside the insertion tube 34 at the distance ΔL from the first pressure sensor 24, the filter processing unit 26 applies filter processing represented by $$G = -e^{-jk\Delta L}$$

to the signal obtained by the first pressure sensor 24, the adder 27 that adds the signal obtained by the first pressure sensor 24 and having undergone filter processing by the filter processing unit 26 and the signal obtained by the second pressure sensor 25, and the analyzer 28 that analyzes the frequency of the signal obtained by the addition using the adder 27.

The estimating method is used by the estimating apparatus 10 that estimates a resonance frequency characteristic at the downstream edge portion 13A of the tube 13 (or a coupling tube) that couples the excitation source 11 to the main unit 12. The estimating apparatus 10 includes the detachable insertion tube 34 provided midway along the tube 13, the first pressure sensor 24 provided inside the insertion tube 34 at the distance L from the exit 14A of the excitation source space 14 in which the excitation source 11 is housed, and the second pressure sensor 25 provided inside the insertion tube 34 at the distance ΔT from the first pressure sensor 24. The estimating apparatus 10 estimates a resonance frequency characteristic at the connecting portion of the tube 13 with the main unit 12 and the tube 13 coupling the excitation source 11 to the main unit 12. The estimating method applies filter processing represented by $$G = -e^{-jk\Delta L}$$

to the signal obtained by the first pressure sensor 24, adds the signal obtained by the first pressure sensor 24 and having undergone filter processing and the signal obtained by the second pressure sensor 25, and analyzes the frequency of the resultant signal.

According to these arrangements, a resonance frequency characteristic (an excitation characteristic for the main unit) at the downstream edge portion 13A of the tube 13 can be estimated on the upstream side by using the simple structure using the two pressure sensors. This makes it possible to grasp a resonance frequency characteristic at the downstream edge portion 13A on the upstream side, which is difficult to estimate in the prior art. It is possible to take an effective countermeasure against excitation of the main unit 12 based on this technique.

In this case, the distance L satisfies $$L + \Delta L < \frac{c}{4f}$$

where c is the sound velocity, f is an observation frequency, and the distance ΔL satisfies $$\Delta L > \frac{c}{\Delta f}$$

where c is the sound velocity and Δf is a sampling frequency.

This arrangement can prevent any sound pressure node from appearing in an observation target frequency range, and hence can implement more accurate estimation of a resonance frequency characteristic by the estimating apparatus 10.

Modification of Third Embodiment

A modification of the estimating apparatus 10 and the estimating method according to the third embodiment will be described with reference to FIG. 26. This modification is the same as the third embodiment except that the positions of the first pressure sensor 24 and the second pressure sensor 25 are changed.

In this modification, one of the positions of the first pressure sensor 24 and the second pressure sensor 25 is changed. The second pressure sensor 25 is provided at a position shifted by a predetermined angle around an axis (central axis) of the insertion tube 34 relative to the first pressure sensor 24. In the case shown in FIG. 26, the second pressure sensor 25 is provided at a position shifted by, for example, 180° around the axis C relative to the first pressure sensor 24. In this case, the angle by which the second pressure sensor 25 is shifted around the axis C relative to the first pressure sensor 24 is not limited to 180° and may be an arbitrary angle.

In the case shown in FIG. 26, the second pressure sensor 25 is shifted by a predetermined angle (for example, 180°) around the axis C relative to the first pressure sensor 24. Obviously, however, the first pressure sensor 24 may be shifted by a predetermined angle (for example, 180°) around the axis C relative to the first pressure sensor 24. In this case, the angle by which the first pressure sensor 24 is shifted around the axis C relative to the second pressure sensor 25 is not limited to 180° and may be an arbitrary angle.

Even such an arrangement does not change the sound pressures measured by the first pressure sensor 24 and the second pressure sensor 25. Accordingly, even when the first pressure sensor 24 and the second pressure sensor 25 are arranged in this manner, it is possible to estimate a resonance frequency at the downstream edge portion 13A of the tube 13 without posing any problem.

Fourth Embodiment

Figure 27:
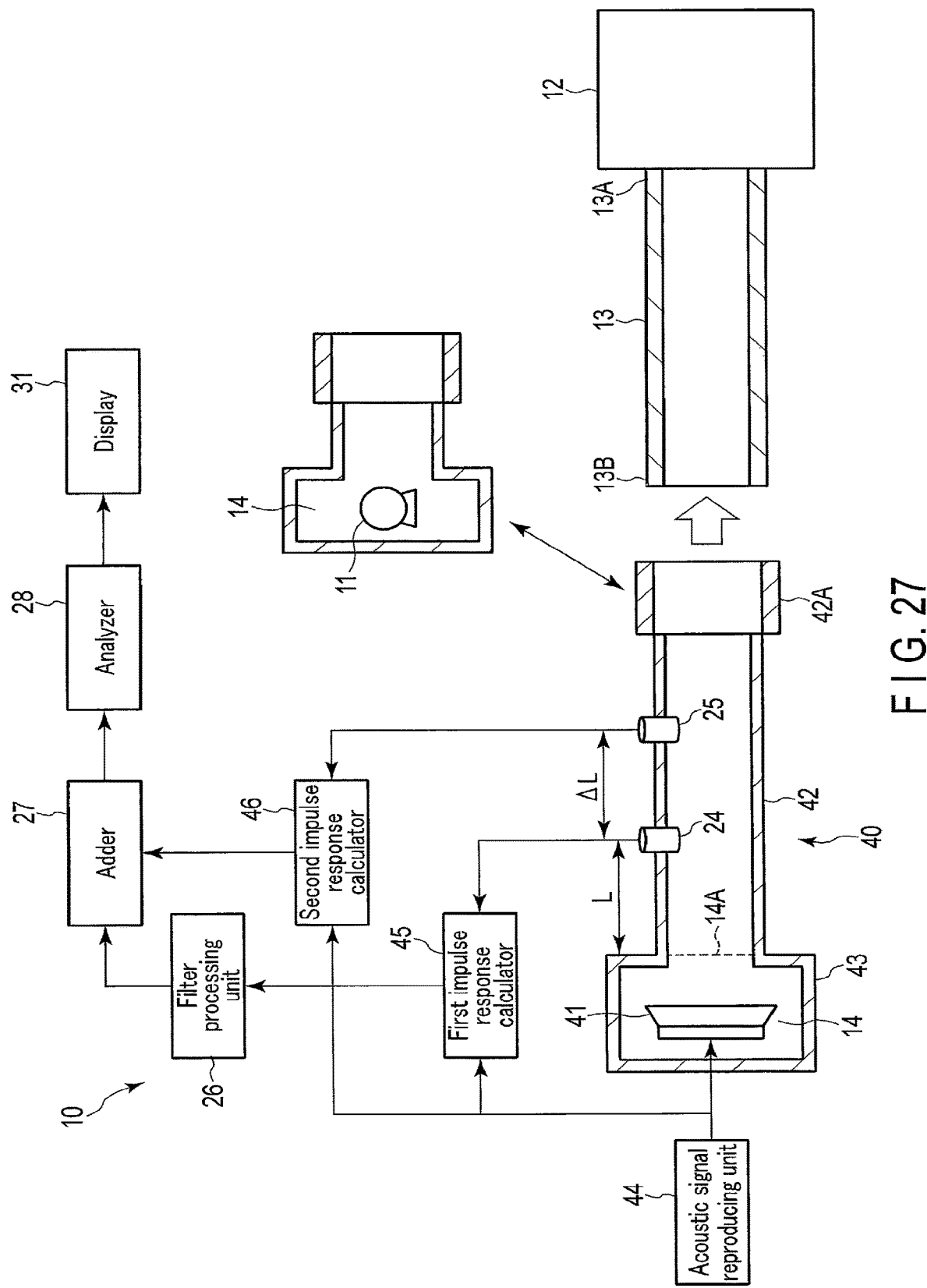
FIG. 27 is a view schematically showing an estimating apparatus for estimating a resonance frequency characteristic according to the fourth embodiment.

An estimating apparatus 10 for estimating a resonance frequency characteristic according to the fourth embodiment will be described with reference to FIG. 27.

The estimating apparatus 10 includes an excitation source 11, a main unit 12, a metal tube 13 (tubing) that connects an excitation source space exit 14A to the main unit 12, and a pseudo-excitation source unit 40 (pseudo-excitation source device) detachably connected to an upstream edge portion 13B of the tube 13 in place of the excitation source 11.

The pseudo-excitation source unit 40 includes a cylindrical installed tube 42, a box-shaped housing 43 provided upstream of the installed tube 42, and a pseudo-excitation source 41 housed inside the housing 43. The pseudo-excitation source 41 is formed from a loudspeaker. The pseudo-excitation source 41 can generate a sound in a pseudo-manner by imitating the excitation source 11, and can output, for example, sounds such as a TSP (Time Stretched Pulse) and white noise. The pseudo-excitation source unit 40 can be mounted on an upstream edge portion 13B of the tube 13 via a connecting portion 42A on the downstream edge portion of the installed tube 42 and can be detached from the upstream edge portion 13B. The pseudo-excitation source unit 40 can be detachably connected to the upstream edge portion of the tube 13 so as to replace the excitation source 11 via the connecting portion 42A of the installed tube 42. An arbitrary method such as screwing or press fitting can be used as a method of fixing the pseudo-excitation source unit 40 to the upstream edge portion 13B.

The estimating apparatus 10 includes an acoustic signal reproducing unit 44 for sending an acoustic signal to the pseudo-excitation source 41, a first pressure sensor 24 provided in the installed tube 42, a second pressure sensor 25 provided in the installed tube 42, a first impulse response calculator 45 connected to the acoustic signal reproducing unit 44 and the first pressure sensor 24, a second impulse response calculator 46 connected to the acoustic signal reproducing unit 44 and the second pressure sensor 25, a filter processing unit 26 (correction filter G or filter) for filtering a signal from the first impulse response calculator 45, an adder 27 (addition circuit) for adding the signal obtained by correcting a signal from the first impulse response calculator 45 by using the correction filter G and a signal from the second impulse response calculator 46, an analyzer 28 (analysis circuit) for analyzing the frequency of the signal obtained by the adder 27, and a display 31 for displaying the analysis result obtained by the analyzer 28.

The first pressure sensor 24 is provided midway along the installed tube 42 at a distance L from the excitation source space exit 14A in the axial direction of the installed tube 42. The second pressure sensor 25 is provided midway along the installed tube 42 at a distance $\Delta T$, from the first pressure sensor 24 in the axial direction of the installed tube 42.

The filter processing unit 26 is formed from the correction filter G according to the above embodiment, that is, equation (4). In addition, the length L and the length $\Delta L$ are set as appropriate to satisfy inequalities (17) and (18).

The estimating method using the estimating apparatus according to this embodiment will be described.

The excitation source 11 is detached from the tube 13, and the pseudo-excitation source unit 40 is connected to the upstream edge portion 13B of the tube 13 in place of the excitation source 11. More specifically, the connecting portion 42A of the installed tube 42 of the pseudo-excitation source unit 40 is connected to the upstream edge portion 13B of the tube 13.

Subsequently, the acoustic signal reproducing unit 44 sends an acoustic signal to the pseudo-excitation source 41 (loudspeaker). This acoustic signal may be a signal corresponding to a TSP (Time Stretched Pulse), white noise, or another type of sound. This causes the pseudo-excitation source 41 (loudspeaker) to generate a traveling wave of sound such as a TSP or white noise toward the main unit 12. The first pressure sensor 24 acquires a sound pressure signal based on the traveling wave generated by the pseudo-excitation source 41 and a sound pressure signal based on the reflected wave reflected by the downstream edge portion 13A of the tube 13. The second pressure sensor 25 acquires a sound pressure signal based on the traveling wave generated by the pseudo-excitation source and a sound pressure signal based on the reflected wave reflected by the downstream edge portion 13A of the tube 13.

Figure 28:
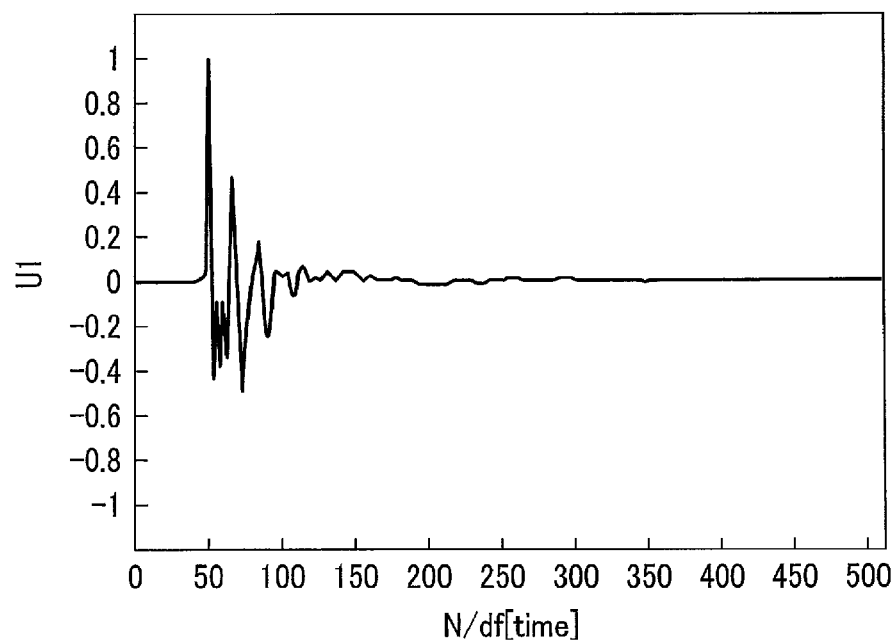
FIG. 28 is a graph showing the first impulse response obtained based on an acoustic signal (input signal) from an acoustic signal reproducing unit and the sound pressure signal acquired by the first pressure sensor in the estimating apparatus shown in FIG. 27.
Figure 29:
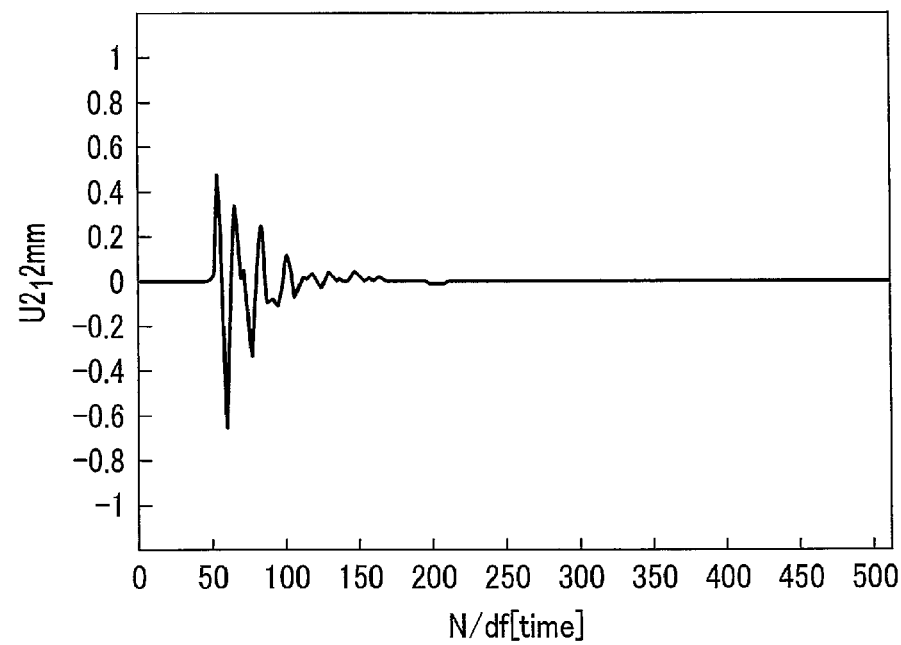
FIG. 29 is a graph showing the second impulse response obtained based on an acoustic signal (input signal) from an acoustic signal reproducing unit and the sound pressure signal acquired by the second pressure sensor in the estimating apparatus shown in FIG. 27.

The first impulse response calculator 45 calculates a first impulse response (a communication channel characteristic or transfer function from the pseudo-excitation source 41 to the first pressure sensor 24) based on the acoustic signal (input signal) sent from the acoustic signal reproducing unit 44 to the pseudo-excitation source 41 and the sound pressure signal acquired by the first pressure sensor 24. FIG. 28 shows this result. Likewise, the second impulse response calculator 46 calculates a second impulse response (a communication channel characteristic or transfer function from the pseudo-excitation source 41 to the second pressure sensor 25) based on the acoustic signal (input signal) sent from the acoustic signal reproducing unit 44 to the pseudo-excitation source 41 and the sound pressure signal acquired by the second pressure sensor 25. FIG. 29 shows the result. Referring to FIGS. 28 and 29, normalization was performed with the amplitude of the first impulse in FIG. 27 being 1. In addition, referring to FIGS. 28 and 29, because the horizontal axis represents the time, the length of a channel through which a traveling wave or reflected wave passes can be measured by multiplying the time from the start of measurement to the first impulse by the sound velocity of 340 m/s.

The filter processing unit 26 performs filter processing represented by equation (4) with respect to the first impulse response signal obtained by the first impulse response calculator 45. More specifically, the first impulse response signal is multiplied by the filter G represented by equation (4) (the first impulse response signal and the filter G are convolution-integrated).

The adder 27 adds the first impulse response signal having undergone filter processing by the filter processing unit 26 and the second impulse response signal.

The impulse response signal obtained by the addition using the adder 27 is the signal from which the influence of the traveling wave is removed. That is, the influence of the reflected wave, that is, only the transfer channel characteristic or transfer function from the downstream edge portion 13A of the tube 13 to the pressure sensor (the first pressure sensor 24 or the second pressure sensor 25), is reflected in this signal. The impulse response signal obtained by the addition using the adder 27 is sent to the analyzer 28. The analyzer 28 then performs frequency analysis of the signal and causes the display 31 to display the result. This makes it possible to estimate a resonance frequency characteristic at the downstream edge portion 13A of the tube 13.

According to the fourth embodiment, the following holds.

The estimating apparatus 10 estimates a resonance frequency characteristic at the downstream edge portion 13A of the tube 13 that couples the excitation source 11 to the main unit 12. The estimating apparatus 10 includes the installed tube 42, the housing 43 provided upstream of the installed tube 42, and the pseudo-excitation source 41 housed inside the housing 43. The estimating apparatus 10 also includes the pseudo-excitation source unit 40 detachably connected to the upstream edge portion 13B of the tube 13, in place of the excitation source 11, via the downstream edge portion 13A of the installed tube 42, the first pressure sensor 24 provided midway along the installed tube 42 at the distance L from the excitation source space exit 14A of the housing 40 43, the second pressure sensor 25 provided along the installed tithe 42 at the distance $\Delta L$ from the first pressure sensor 24, the first impulse response calculator 45 for calculating the first impulse response signal from the signal input to the pseudo-excitation source 41 and the signal obtained by the first pressure sensor 24, the second impulse response calculator 46 for calculating the second impulse response signal from the signal input to the pseudo-excitation source 41 and the signal obtained from the second pressure sensor 25, the filter processing unit 26 for performing filter processing represented by $$G = -e^{-jk\Delta L}$$

with respect to the first impulse response signal, the adder 27 for adding the first impulse response signal having undergone the filter processing by the filter processing unit 26 and the second impulse response signal, and the analyzer 28 for analyzing the frequency of the signal obtained by the addition using the adder 27.

The estimating method is used by the estimating apparatus 10 that estimates a resonance frequency characteristic at the downstream edge portion 13A of the tube 13 that couples the excitation source 11 to the main unit 12. The estimating apparatus 10 includes the installed tube 42, the housing 43 provided upstream of the installed tube 42, and the pseudo-excitation source 41 housed inside the housing 43. The estimating apparatus 10 also includes the pseudo-excitation source unit 40 that is detachably connected to the upstream edge portion 13B of the tube 13, in place of the excitation source 11, via the downstream edge portion of the installed tube 42, the first pressure sensor 24 provided midway along the installed tube 42 at the distance L from the excitation source space exit 14A of the housing 43, and the second pressure sensor 25 provided midway along the installed tube 42 at the distance $\Delta L$ from the first pressure sensor 24. The estimating method calculates the first impulse response signal from the signal input to the pseudo-excitation source 41 and the signal obtained from the first pressure sensor 24, calculates the second impulse response signal from the signal input to the pseudo-excitation source 41 and the signal obtained from the second pressure sensor 25, performs filter processing represented by $$G = -e^{-jk\Delta L}$$

with respect to the first impulse response signal, adds the first impulse response signal having undergone the filter processing and the second impulse response signal, and analyzes the frequency of the signal obtained by the addition.

According to these arrangements, a resonance frequency is estimated by measuring the transfer function (impulse response) of a channel through which a traveling wave and a reflected wave pass. Even in an environment with much disturbance such as extraneous noise, it is possible to accurately estimate a resonance frequency by removing the influence of disturbance.

In this case, the distance L satisfies $$L + \Delta L < \frac{c}{4f}$$

where c is the sound velocity and f is an observation frequency. The distance $\Delta L$ satisfies the following inequality $$\Delta L < \frac{c}{\Delta f}$$

where c is the sound velocity and $\Delta f$ is a sampling frequency.

These arrangements can prevent any sound pressure node from being generated in an observation target frequency range, and hence the estimating apparatus 10 can implement accurate estimation of a resonance frequency characteristic.

In this case, the pseudo-excitation source 41 is a loudspeaker. This arrangement can implement the pseudo-excitation source 41 with a simple arrangement.

Modification of Fourth Embodiment

A modification of the estimating apparatus 10 and the estimating method according to the fourth embodiment will be described with reference to FIG. 26. This modification is the same as the fourth embodiment except that the positions of the first pressure sensor 24 and the second pressure sensor 25 are changed.

In this modification, one of the positions of the first pressure sensor 24 and the second pressure sensor 25 is changed. The second pressure sensor 25 is provided at a position shifted by a predetermined angle around the axis C (central axis) of the insertion tube 34 relative to the first pressure sensor 24. In the case shown in FIG. 26, the second pressure sensor 25 is provided at a position shifted by, for example, 180° around the axis C relative to the first pressure sensor 24. In this case, the angle by which the second pressure sensor 25 is shifted around the axis C relative to the first pressure sensor 24 is not limited to 180° and may be an arbitrary angle.

In the case shown in FIG. 26, the second pressure sensor 25 is shifted by a predetermined angle (for example, 180°) around the axis C relative to the first pressure sensor 24. Obviously, however, the first pressure sensor 24 may be shifted by a predetermined angle (for example, 180°) around the axis C relative to the first pressure sensor 24. In this case, the angle by which the first pressure sensor 24 is shifted around the axis C relative to the second pressure sensor 25 is not limited to 180° and may be an arbitrary angle.

Even such an arrangement does not change the sound pressures measured by the first pressure sensor 24 and the second pressure sensor 25. Accordingly, even when the first pressure sensor 24 and the second pressure sensor 25 are arranged in this manner, it is possible to estimate a resonance frequency at the downstream edge portion 13A of the tube 13 without posing any problem.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An estimating apparatus comprising:
   an insertion tube configured to be detachably mounted midway along a coupling tube that couples an excitation source to a main unit which is subjected to vibrations propagated via the coupling tube;
   a first pressure sensor configured to be provided inside the insertion tube at a distance L from an exit of an excitation source space housing the excitation source;
   a second pressure sensor configured to be provided inside the insertion tube at a distance $\Delta L$ from the first pressure sensor;
   a filter processing unit configured to perform filter processing represented by
   $$G = -e^{-jk\Delta L}$$
   with respect to a first signal obtained by the first pressure sensor;
   an adder configured to add a filtered signal and a second signal obtained by the second pressure sensor, the filtered signal being the first signal having undergone filter processing by the filter processing unit; and
   an analyzer configured to analyze a frequency of an added signal obtained by the adder to estimate a resonance frequency characteristic at a downstream edge portion of the coupling tube, the added signal originating from the first signal and the second signal.

2. The apparatus according to claim 1, wherein the distance L satisfies
$$L + \Delta L < \frac{c}{4f}$$

where c is a sound velocity and f is an observation target frequency, and the distance $\Delta L$ satisfies $$\Delta L < \frac{c}{\Delta f}$$

where c is the sound velocity and $\Delta f$ is a sampling frequency.

3. The apparatus according to claim 1, wherein the second pressure sensor is shifted by a predetermined angle around an axis of the coupling tube relative to the first pressure sensor.

4. The apparatus according to claim 2, wherein the second pressure sensor is shifted by a predetermined angle around an axis of the coupling tube relative to the first pressure sensor.

5. An estimating apparatus comprising:
   a pseudo-excitation source unit configured to comprise an installed tube, a housing provided upstream of the installed tube, and a pseudo-excitation source housed inside the housing, and configured to be detachably connected to an upstream edge portion of the installed tube, in place of an excitation source, via a downstream edge portion of the installed tube, the installed tube being installed to a coupling tube that couples the pseudo-excitation source to a main unit which is subjected to vibrations propagated via the coupling tube;
   a first pressure sensor configured to be provided midway along the installed tube at a distance L from an exit of the housing;
   a second pressure sensor configured to be provided midway along the installed tube at a distance $\Delta L$ from the first pressure sensor;
   a first calculator configured to calculate a first impulse response signal from a third signal input to the pseudo-excitation source and a first signal obtained by the first pressure sensor;
   a second calculator configured to calculate a second impulse response signal from the third signal and a second signal obtained by the second pressure sensor;
   a filter processing unit configured to perform filter processing represented by
   $$G = -e^{-jk\Delta L}$$
   with respect to the first impulse response signal;
   an adder configured to add a filtered signal and the second impulse response signal, the filtered signal being the first impulse response signal having undergone filter processing by the filter processing unit; and
   an analyzer configured to analyze a frequency of an added signal obtained by the adder to estimate a resonance frequency characteristic at a downstream edge portion of the installed tube, the added signal originating from the first signal and the second signal.

6. The apparatus according to claim 5, wherein the distance L satisfies $$L + \Delta L < \frac{c}{4f}$$

where c is a sound velocity and f is an observation target frequency, and the distance $\Delta L$ satisfies $$\Delta L > \frac{c}{\Delta f}$$

where c is the sound velocity and $\Delta f$ is a sampling frequency.

7. The apparatus according to claim 5, wherein the pseudo-excitation source is a loudspeaker.

8. The apparatus according to claim 6, wherein the pseudo-excitation source is a loudspeaker.

9. The apparatus according to claim 5, wherein the second pressure sensor is shifted by a predetermined angle around an axis of the coupling tube relative to the first pressure sensor.

10. The apparatus according to claim 6, wherein the second pressure sensor is shifted by a predetermined angle around an axis of the coupling tube relative to the first pressure sensor.

11. The apparatus according to claim 7, wherein the second pressure sensor is shifted by a predetermined angle around an axis of the coupling tube relative to the first pressure sensor.

12. The apparatus according to claim 8, wherein the second pressure sensor is shifted by a predetermined angle around an axis of the coupling tube relative to the first pressure sensor.

13. An estimating method used by an estimating apparatus that comprises an insertion tube configured to be detachably provided midway along a coupling tube that couples an excitation source to a main unit which is subjected to vibrations propagated via the coupling tube, a first pressure sensor configured to be provided inside the insertion tube at a distance L from an exit of an excitation source space housing the excitation source, and a second pressure sensor configured to be provided inside the insertion tube at a distance $\Delta L$ from the first pressure sensor and is configured to estimate a resonance frequency characteristic at a downstream edge portion of the coupling tube, the method comprising:

performing filter processing represented by $$G=-e^{-jk\Delta L}$$

with respect to a first signal obtained by the first pressure sensor;

adding a filtered signal and a second signal obtained by the second pressure sensor, the filtered signal being the first signal having undergone filter processing; and analyzing a frequency of an added signal obtained in the adding to estimate a resonance frequency characteristic at a downstream edge portion of the coupling tube, the added signal originating from the first signal and the second signal.

14. An estimating method used by an estimating apparatus that comprises a pseudo-excitation source unit configured to comprise an installed tube, a housing provided upstream of the installed tube, and a pseudo-excitation source housed in the housing, and configured to be detachably connected to an upstream edge portion of the installed tube, in place of an excitation source, via a downstream edge portion of the installed tube, a first pressure sensor provided midway along the installed tube at a distance L from an exit of the housing, and a second pressure sensor provided midway along the installed tube at a distance $\Delta L$ from the first pressure sensor, and is configured to estimate a resonance frequency characteristic at a downstream edge portion of the installed tube, the installed tube being installed to a coupling tube that couples the pseudo-excitation source to a main unit which is subjected to vibrations propagated via the coupling tube, the method comprising:

calculating a first impulse response signal from a third signal input to the pseudo-excitation source and a first signal obtained by the first pressure sensor;

calculating a second impulse response signal from the third signal and a second signal obtained by the second pressure sensor;

performing filter processing represented by $$G=-e^{-jk\Delta L}$$

with respect to the first impulse response signal;

adding a filtered signal and the second impulse response signal, the filtered signal being the first impulse response signal having undergone the filter processing; and analyzing a frequency of an added signal obtained in the adding to estimate a resonance frequency characteristic at a downstream edge portion of the installed tube, the added signal originating from the first signal and the second signal.

* * * * *